(12) United States Patent
Furuichi

(10) Patent No.: US 12,335,930 B2
(45) Date of Patent: Jun. 17, 2025

(54) COMMUNICATION CONTROL DEVICE, COMMUNICATION DEVICE, AND COMMUNICATION CONTROL METHOD

(71) Applicant: SONY GROUP CORPORATION, Tokyo (JP)

(72) Inventor: Sho Furuichi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 819 days.

(21) Appl. No.: 17/437,495

(22) PCT Filed: Jan. 30, 2020

(86) PCT No.: PCT/JP2020/003422
§ 371 (c)(1),
(2) Date: Sep. 9, 2021

(87) PCT Pub. No.: WO2020/195145
PCT Pub. Date: Oct. 1, 2020

(65) Prior Publication Data
US 2022/0150894 A1 May 12, 2022

(30) Foreign Application Priority Data
Mar. 25, 2019 (JP) .................................. 2019-056245

(51) Int. Cl.
*H04W 72/0453* (2023.01)
(52) U.S. Cl.
CPC .............................. *H04W 72/0453* (2013.01)
(58) Field of Classification Search
CPC ................................................ H04W 72/0453
(Continued)

(56) References Cited

U.S. PATENT DOCUMENTS

2013/0237263 A1 9/2013 Vuyyuru
2013/0310061 A1 11/2013 Sawai
(Continued)

FOREIGN PATENT DOCUMENTS

CN 103380636 A 10/2013
CN 104285461 A 1/2015
(Continued)

OTHER PUBLICATIONS

"Requirements for Commercial Operation in the U.S. 3550-3700 MHz Citizens Broadband Radio Service Band", Wireless Innovation Forum, WINNF-TS-0112, Version 1.6.0, Oct. 30, 2018, 80 pages.

(Continued)

*Primary Examiner* — Angel T Brockman
(74) *Attorney, Agent, or Firm* — CHIP LAW GROUP

(57) ABSTRACT

Provided is a communication control device that includes: an acquisition unit that acquires first information regarding a channel occupied by a primary communication service among a plurality of channels allocated to the primary communication service. The communication control device further includes a specifying unit that handles the channel occupied by the primary communication service only in a part of a frequency band among the frequency bands corresponding to the channels by specifying another frequency band, that is, a frequency band other than the part of the frequency band. The communication control device further includes a control unit that allocates the specified other frequency band to one or more secondary use communication devices that provide a secondary communication service different from the primary communication service.

14 Claims, 18 Drawing Sheets

(58) Field of Classification Search
USPC .......................................................... 370/329
See application file for complete search history.

(56) References Cited

U.S. PATENT DOCUMENTS

| | | |
|---|---|---|
| 2015/0148054 A1 | 5/2015 | Futaki et al. |
| 2017/0238320 A1 | 8/2017 | Fukuta et al. |

FOREIGN PATENT DOCUMENTS

| | | |
|---|---|---|
| EP | 2680630 A1 | 1/2014 |
| EP | 2843982 A1 | 3/2015 |
| EP | 3217703 A1 | 9/2017 |
| JP | 2013-187895 A | 9/2013 |
| WO | 2012/114971 A1 | 8/2012 |
| WO | 2013/161136 A1 | 10/2013 |
| WO | 2016/072468 A1 | 5/2016 |

OTHER PUBLICATIONS

International Search Report and Written Opinion of PCT Application No. PCT/JP2020/003422, issued on Apr. 14, 2020, 09 pages of ISRWO.

FIG.16

Legend:
- ▒ BEING USED BY PAL
- ▓ BEING USED BY PAL & BEING USED BY RADAR
- ☐ NOT BEING USED BY PAL

CHANNELS CORRESPONDING TO SPECTRUM ACTUALLY BEING USED BY IN-SHIP RADAR

| #1 | #2 | #3 | #4 | #5 | #6 | #7 | #8 | #9 | #10 |

3,550MHz — 3,650MHz

CHANNEL BEING USED BY PAL

| #1 | #2 | #3 | #4 | #5 | #6 | #7 | #8 | #9 | #10 |

3,550MHz — 3,650MHz

SPECTRUM BEING USED BY IN-SHIP RADAR ACCORDING TO DETECTION RESULT BY ESC

| #1 | #2 | #3 | #4 | #5 | #6 | #7 | #8 | #9 | #10 |

3,550MHz — 3,650MHz

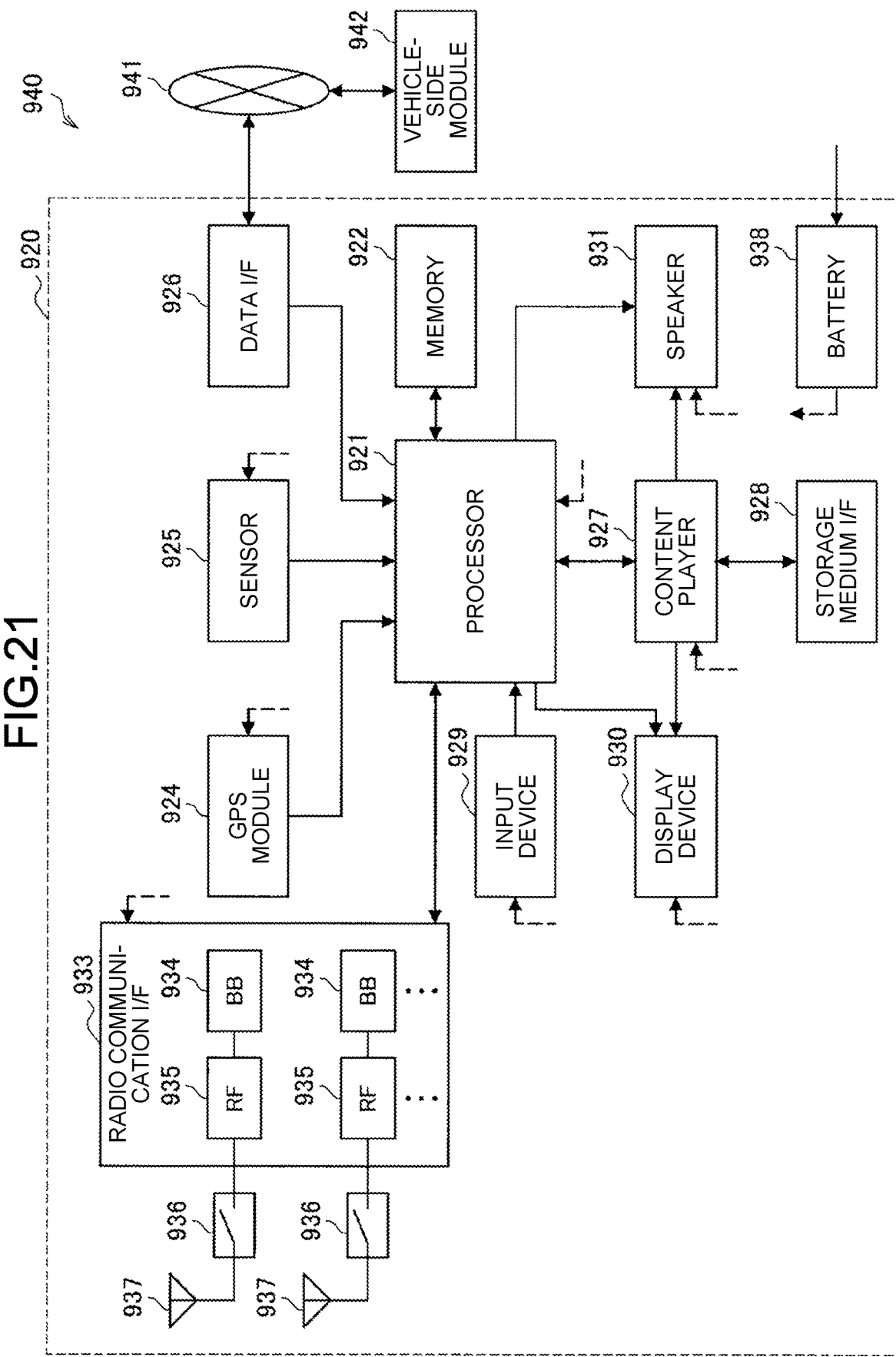

COMMUNICATION CONTROL DEVICE, COMMUNICATION DEVICE, AND COMMUNICATION CONTROL METHOD

CROSS REFERENCE TO RELATED APPLICATIONS

This application is a U.S. National Phase of International Patent Application No. PCT/JP2020/003422 filed on Jan. 30, 2020, which claims priority benefit of Japanese Patent Application No. JP 2019-056245 filed in the Japan Patent Office on Mar. 25, 2019. Each of the above-referenced applications is hereby incorporated herein by reference in its entirety.

FIELD

The present disclosure relates to a communication control device, a communication device, and a communication control method.

BACKGROUND

With recent increase and diversification of wireless or radio environments having a mixture of various radio systems and the volume of content transferred via radio communications, there has been a problem of depletion of radio resources (frequency/spectrum) available for allocation to the radio systems. Regarding this issue, many radio bands are already used by incumbent radio systems, making it difficult to allocate new radio resources. In view of such circumstances, in order to obtain available radio resources, there has been a demand for utilization of temporally and spatially vacant radio waves (referred to as a white space) (dynamic spectrum sharing referred to as Dynamic Spectrum Access (DSA)) in incumbent radio systems by utilization of cognitive radio technology.

In the recent United States, with the aim of opening a federal use band (3.55-3.70 GHz), which overlaps with a frequency band that is worldwide 3GPP bands 42 and 43, to the general public, legislation and standardization of a Citizens Broadband Radio Service (CBRS) utilizing a spectrum sharing technology are accelerating.

In addition, the cognitive radio technology can contribute not only to dynamic spectrum sharing referred to as dynamic spectrum access but also to improvement of spectrum use efficiency by a radio system. For example, ETSI EN 303 387 and IEEE 802.19.1-2014 include specifications of inter-radio system coexistence technology utilizing a database.

For example, according to C.F.R Part 96, the CBRS band available by priority access licensees using a Priority Access License (PAL) is defined as 3550-3650 MHz, prescribing that 10 MHz channels are to be allocated per one PAL. Furthermore, regarding the CBRS band, Non Patent Literature 1 discloses that a Dynamic Protection Area (DPA) is provided as a protection area for an in-ship radar, and the Environmental Sensing Capability (ESC) monitors a radio wave use status of the in-ship radar (that is, the primary communication service) in the DPA.

CITATION LIST

Non Patent Literature

Non Patent Literature 1: The Software Defined Radio Forum Inc., "WINNF-TS-0112-V1.6.0 Requirements for Commercial Operation in the U.S. 3550-3700 MHz Citizens Broadband Radio Service Band" Oct. 30, 2018, WIRELESS INNOBATION FORUM, [searched on Mar. 22, 2019], Internet, <URL: https://winnf.memberclicks.net/assets/CBRS/WINNF-TS-0112.pdf>

SUMMARY

Technical Problem

On the other hand, there is an assumable situation in which occurrence of an error in the detection result of the frequency band used by the primary communication service among the frequency bands to be a target of spectrum sharing as the CBRS band described above (in other words, the frequency band to be the target of secondary use) would limit the frequency band actually available as secondary use.

In view of this, the present disclosure proposes a technology that enables spectrum sharing in a more suitable manner even in a situation where an error occurs in the detection result of the frequency band used by the primary communication service.

Solution to Problem

According to the present disclosure, a communication control device is provided that includes: an acquisition unit that acquires first information regarding a channel occupied by a primary communication service among a plurality of channels allocated to the primary communication service; a specifying unit that handles the channel occupied by the primary communication service only in a part of a frequency band among the frequency bands corresponding to the channels by specifying another frequency band, that is, a frequency band other than the part of the frequency band; and a control unit that allocates the specified other frequency band to one or more secondary use communication devices that provide a secondary communication service different from the primary communication service.

Moreover, according to the present disclosure, a communication device is provided that includes: a notification unit that notifies a communication control device of a request related to allocation of a part of a plurality of channels allocated to a primary communication service; and an acquisition unit that acquires, as a response to the request, fourth information which is specified for the channel occupied by the primary communication service only for a part of a frequency band among frequency bands corresponding to the channel and which corresponds to an allocation result of another frequency band, that is, a frequency band other than the part of the frequency band.

Moreover, according to the present disclosure, a communication control method to be executed by a computer is provided that includes: acquiring first information regarding a channel occupied by a primary communication service among a plurality of channels allocated to the primary communication service; handling the channel occupied by the primary communication service only in a part of a frequency band among the frequency bands corresponding to the channels by specifying another frequency band, that is, a frequency band other than the part of the frequency band; and allocating the specified other frequency band to one or more secondary use communication devices that provide a secondary communication service different from the primary communication service.

BRIEF DESCRIPTION OF DRAWINGS

FIG. 16 is a diagram illustrating an example of processes related to channel reallocation by the system according to the embodiment.

FIG. 21 is a block diagram illustrating an example of a schematic configuration of a car navigator.

DESCRIPTION OF EMBODIMENTS

Figure 1:
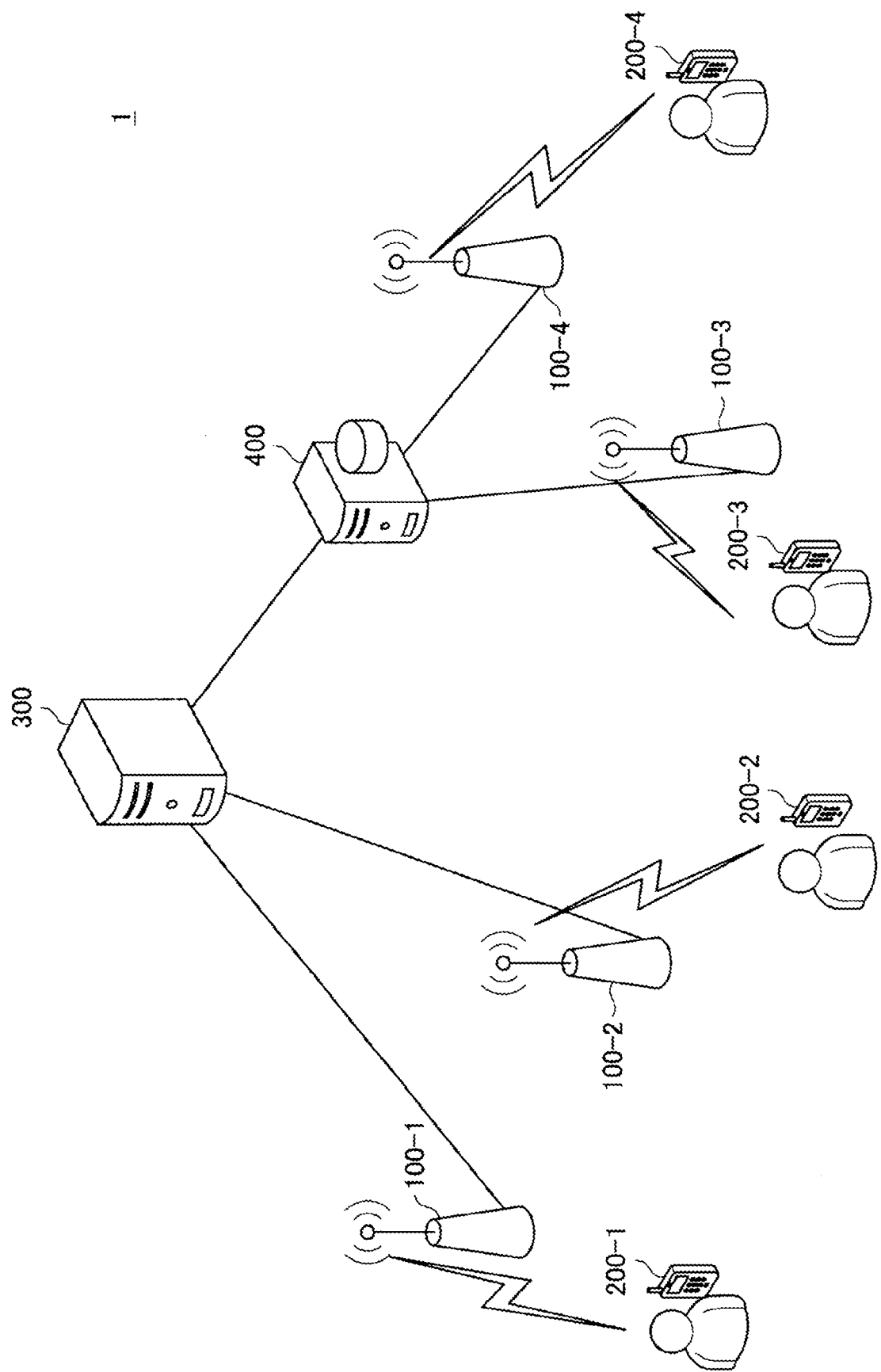
FIG. 1 is a diagram illustrating an example of a schematic configuration of a system according to an embodiment of the present disclosure.

Hereinafter, preferred embodiments of the present disclosure will be described in detail with reference to the accompanying drawings. In the present specification and the drawings, components having substantially the same functional configuration will be denoted with the same reference numerals and redundant description will be omitted.

1. Representative scenario assumed in present disclosure
1.1. System model
1.1.1. Configuration Example of Communication Device
1.1.2. Configuration Example of Terminal Device
1.1.3. Configuration Example of Communication Control Device
1.2. Terms Related to Spectrum Sharing
2. Description of Various Procedures
2.1. Registration Procedure
2.1.1. Details of Required Parameters
2.1.1.1. Supplement Of Required Parameters
2.1.2. Details of registration Process
2.2. Available Spectrum Query Procedure
2.2.1. Details of Required Parameters
2.2.2. Details of Available Spectrum Evaluation Process
2.3. Spectrum Grant Procedure
2.3.1. Details of Spectrum Grant Process
2.4. Spectrum Use Notification/Heartbeat
2.5. Supplement to Various Procedures
2.6. Various Procedures Regarding Terminal
2.7. Procedure Occurring Between Communication Control Devices
2.7.1. Information Exchange
2.7.2. Command/request Procedures
3. Technical Problems
4. Exemplary Embodiments of Present Disclosure
4.1. Architecture and Sequence
4.2. Sequence Details
5. Application Examples
5.1. Application Examples Related to Server
5.2. Application Examples Related to Base Station
5.3. Application examples Related to Terminal Devices
6. Conclusion

1. REPRESENTATIVE SCENARIO ASSUMED IN PRESENT DISCLOSURE

1.1. System Model

First, an example of a schematic configuration of a system (referred to as a system model) according to an embodiment of the present disclosure will be described with reference to FIG. 1. FIG. 1 is a diagram illustrating an example of a schematic configuration of a system according to the present embodiment. As illustrated in FIG. 1, a system 1 according to the present embodiment includes communication devices 100 (for example, communication devices 100-1 to 100-4), terminal devices 200 (for example, terminal devices 200-1 to 200-4), and a communication control device 300. The system 1 may also include a network manager 400.

The communication device 100 is typically a device corresponding to a radio base station (also referred to as a Base Station, Node B, eNB, gNB, or the like) or a radio access point. The communication device 100 may be a radio relay station. Furthermore, the communication device 100 may be an optical link device referred to as a remote radio head (RRH).

The communication device 100 does not necessarily have to be a statically installed device, and may be a device installed in a moving body such as an automobile, for example. Furthermore, the communication device 100 need not exist on the ground, and may be a device having a communication function on an object existing in the air or space, such as an aircraft, a drone, a helicopter, a satellite, or the like. Furthermore, the communication device 100 may be a device having a communication function on an object existing on the sea or under the sea, such as a ship or a submarine. In such a case, the communication device 100 can perform radio communication with another communication device which is statically installed.

The coverage provided by the communication device 100 can be allowed to have various sizes from a relatively large coverage such as a macro cell to a small coverage such as a pico cell. Furthermore, one cell may be formed by a distributed antenna system (DAS) and a plurality of communication devices 100. Furthermore, in a case where the communication device 100 has a function referred to as beamforming, a cell or a service area may be formed for each of beams.

The communication device 100 can be used, operated, or managed by various entities. Examples of entities include: a mobile network operator (MNO); a mobile virtual network operator (MVNO); a mobile virtual network enabler (MVNE); a neutral host network (NHN) operator; an enterprise; an educational institution (incorporated educational institutions, boards of education of local governments, or the like); a real estate (building, apartment, or the like) administrator; or an individual. The above is merely an example, and the application destination of the technology according to the present disclosure is not limited. Furthermore, the communication device 100 may be a piece of shared equipment used by a plurality of business operators or a plurality of individuals. In addition, installation and operation of the equipment may be performed by a third party different from the user.

The communication device 100 operated by the company can typically be connected to various networks such as the Internet via a core network. Furthermore, operation management and maintenance of the communication device 100 can be performed by a function referred to Operation, Administration & Maintenance (OA & M), for example. Furthermore, for example, there may be provided a network manager 400 that integrally controls the communication device 100 in the network.

The terminal device 200 (also referred to as User Equipment, User Terminal, User Station, Mobile Terminal, Mobile Station, or the like) can typically be implemented as a piece of communication equipment, such as a smartphone. Furthermore, as another example, the terminal device 200 may be a piece of equipment such as a business camera equipped with a communication function. Furthermore, the terminal device 200 need not be used by a person, and may be a device connectable to a network, such as a sensor installed on a machine or in a building of a factory, or the like, including a device for Machine Type Communication (MTC), for example.

Furthermore, the terminal device 200 may be a device referred to as Customer Premises Equipment (CPE) used in a wireless backhaul or the like.

Furthermore, as represented by D2D and V2X, the terminal device 200 may have a relay communication function or an inter-terminal communication function.

Furthermore, the terminal device 200 does not necessarily have to exist on the ground, and may be configured as a device having a communication function on an object existing in the air or space, such as an aircraft, a drone, a helicopter, a satellite, or the like. The terminal device 200 may also be configured as a device having a communication function on an object existing on the sea or under the sea, such as a ship or a submarine.

The communication control device 300 is typically a device that performs determination and/or permission, instruction, management, or the like, regarding communication parameters for the communication device 100. In the spectrum sharing environment, a database server such as a geolocation database (GLDB) or a Spectrum Access System (SAS) can correspond to the communication control device 300. Furthermore, a control device such as a spectrum manager/coexistence manager that performs radio wave interference control between communication devices, represented by devices defined in ETSI EN 303 387 or IEEE 802.19.1a-2017, can also correspond to the communication control device 300. Furthermore, for example, a Registered Location Secure Server (RLSS) defined in IEEE 802.11-2016 can also correspond to the communication control device 300. Basically, the control target of the communication control device 300 is the communication devices 100. In addition to this, the terminal devices 200 under the control of the communication device 100 may also be the control target of the communication control device 300.

Figure 2:
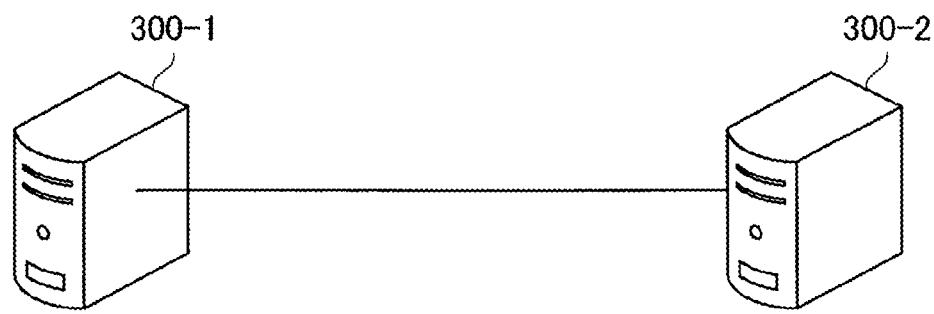
FIG. 2 is a diagram illustrating an outline of an example of a model when a plurality of communication control devices is dispersedly arranged.

Furthermore, the communication control device 300 may exist in plurality. For example, FIG. 2 is a diagram illustrating an outline of an example of a model when a plurality of communication control devices 300 is dispersedly arranged. When there is a plurality of communication control devices 300 as in the example illustrated in FIG. 2, for example, the plurality of communication control devices 300 (namely, communication control devices 300-1 and 300-2) may exchange information regarding the individually managed communication devices 100, and may perform various calculations related to necessary spectrum allocation and interference control by using the information acquired by the exchange.

The communication control device 300 may be disposed outside or inside the network to which the communication device 100 belongs. An assumable representative exemplary case where the communication control device 300 is disposed outside the network can be a public cloud or the like. Furthermore, in a case where the communication control device 300 is disposed inside the network, the communication control device 300 can be disposed as a part of a core network of a cellular system or as a management device of an enterprise network.

Figure 3:
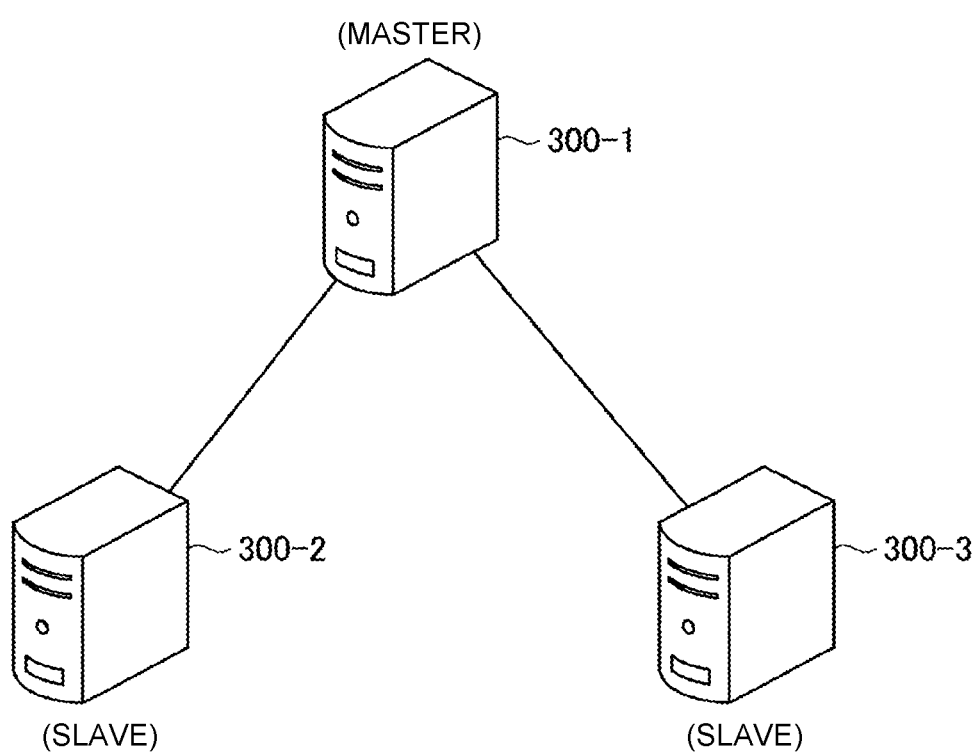
FIG. 3 is a diagram illustrating an outline of an example of a model in which a part of the communication control devices performs an integrated central control of the plurality of communication control devices.

Furthermore, FIG. 3 is a diagram illustrating an outline of an example of a model (referred to as master-slave type) in which a part of the communication control devices 300 performs an integrated central control of a plurality of communication control devices 300. In the example illustrated in FIG. 3, the master communication control device 300-1 can also integrate the plurality of slave communication control devices 300 (for example, the slave communication control devices 300-2 and 300-3) and make intensive decision making. Furthermore, the master communication control device 300-1 can also perform, for example, delegation and discarding of the decision-making authority to each of the slave communication control devices 300 for the purpose of load distribution (load balancing) or the like.

In order to fulfil a given role, the communication control device 300 can acquire necessary information from entities other than the communication device 100 and the terminal device 200. As a specific example, the communication control device 300 can acquire information necessary for protection of various communications, such as location information of a primary system, from a database (regulatory database) managed and/or operated by a radio administration organizations of a country or a region. An example of the regulatory database is the Universal Licensing System (ULS) operated by the Federal Communications Commission. Other examples of information necessary for protection of various communications can include Out-of-Band Emission (OOBE) limit, Adjacent Channel Leakage Ratio (ACLR), Adjacent Channel Selectivity, fading margin, and/or Protection Ratio (PR). For these examples, when a numerical value is legislatively given as a fixed value, it is desirable to use the numerical value.

Furthermore, as another example, it is also conceivable that the communication control device 300 acquires radio wave sensing information from a radio wave sensing system installed and operated for the purpose of radio wave detection in the primary system. As a specific example, the communication control device 300 may acquire radio wave detection information of the primary system from a radio wave sensing system such as an Environmental Sensing Capability (ESC) in CBRS of the United States. Furthermore, in a case where the communication device 100 or the terminal device 200 has a sensing capability, the communication control device 300 may acquire radio wave detection information of the primary system from the communication device 100 or the terminal device 200.

Note that the interface between the entities is not particularly limited, and may be, for example, either wired or wireless. For example, not only a wired channel but also a wireless interface independent on spectrum sharing may be used as an interface between the communication control device 300 and the communication device 100. Examples of the wireless interface independent on spectrum sharing include a wireless interface provided by a mobile network operator via a licensed band, Wi-Fi (registered trademark) communication using an incumbent license-exempt band, or the like.

Here, an example of functional configurations of the communication device 100 and the terminal device 200 will be described. The functional configuration of the communication control device 300 will be separately described below in detail.

1.1.1. Configuration Example of Communication Device

Figure 4:
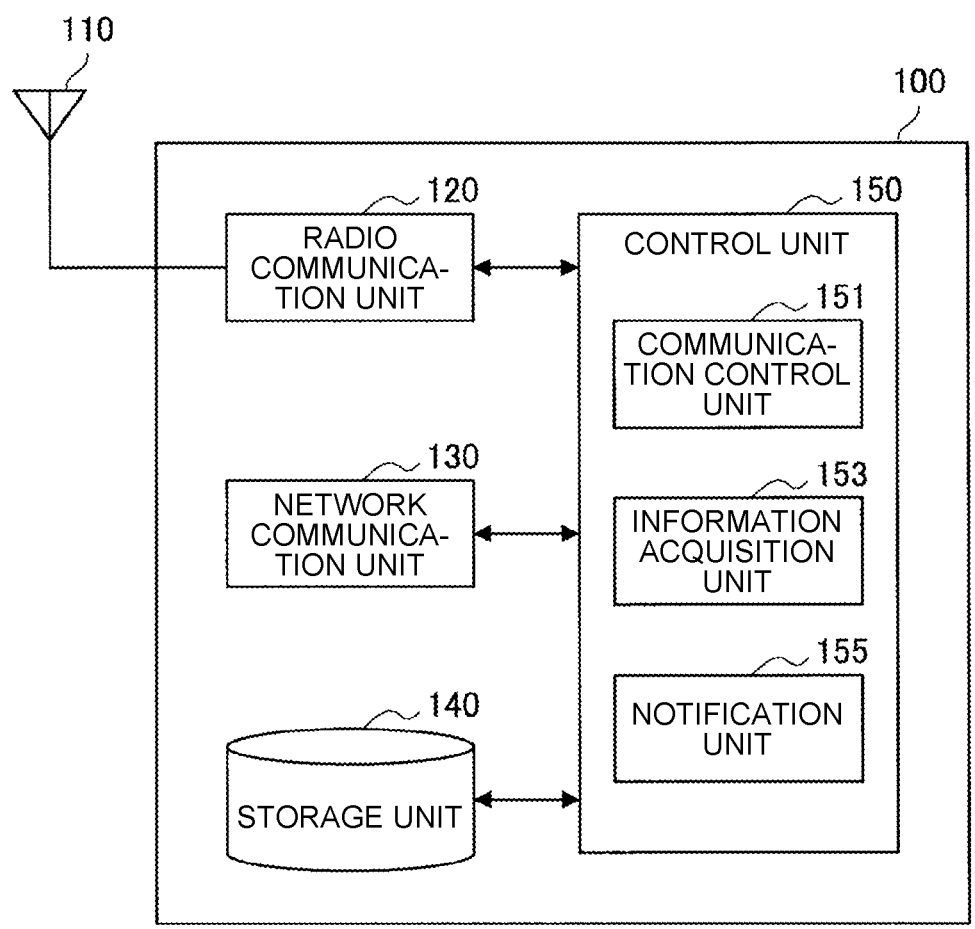
FIG. 4 is a block diagram illustrating an example of a configuration of a communication device according to the embodiment.

The configuration of the communication device 100 according to an embodiment of the present disclosure will be described with reference to FIG. 4. FIG. 4 is a block diagram illustrating an example of a configuration of the communication device 100 according to an embodiment of the present disclosure. Referring to FIG. 4, the communication device 100 includes an antenna unit 110, a radio communication unit 120, a network communication unit 130, a storage unit 140, and a control unit 150.

(1) Antenna Unit 110

The antenna unit 110 radiates the signal output by the radio communication unit 120 to space as a radio wave. Furthermore, the antenna unit 110 converts a radio wave in space into a signal and outputs the signal to the radio communication unit 120.

(2) Radio Communication Unit 120

The radio communication unit 120 transmits and receives signals. For example, the radio communication unit 120 transmits a downlink signal to the terminal device and receives an uplink signal from the terminal device.

(3) Network Communication Unit 130

The network communication unit 130 transmits and receives information. For example, the network communication unit 130 transmits information to another node and receives information from another node. For example, the other nodes include other base stations and core network nodes.

As described above, in the system 1 according to the present embodiment, the terminal device might operate as a relay terminal and relay the communication between a remote terminal and the base station in some cases. In such a case, for example, a radio communication device 100C corresponding to the relay terminal does not have to include the network communication unit 130.

(4) Storage Unit 140

The storage unit 140 temporarily or permanently stores a program and various data for the operation of the communication device 100.

(5) Control Unit 150

The control unit 150 provides various functions of the communication device 100. The control unit 150 includes a communication control unit 151, an information acquisition unit 153, and a notification unit 155. The control unit 150 can further include other components other than these components. That is, the control unit 150 can perform operations other than the operations of these components.

The communication control unit 151 executes various processes related to the control of radio communication with the terminal device 200 via the radio communication unit 120. Furthermore, the communication control unit 151 executes various processes related to the control of communication with other nodes (for example, other base stations, core network nodes, or the like) via the network communication unit 130.

The information acquisition unit 153 acquires various types of information from the terminal device 200 and other nodes. The acquired information may be used, for example, for controlling radio communication with a terminal device, controlling for cooperation with other nodes, or the like.

The notification unit 155 notifies the terminal device 200 and other nodes of various types of information. As a specific example, the notification unit 155 may notify the terminal device 200 of various types of information needed for the terminal device 200 within the cell to perform radio communication with the communication device 100. Furthermore, as another example, the notification unit 155 may notify another node (for example, another base station) of the information acquired from the terminal device in the cell.

1.1.2. Configuration Example of Terminal Device

Figure 5:
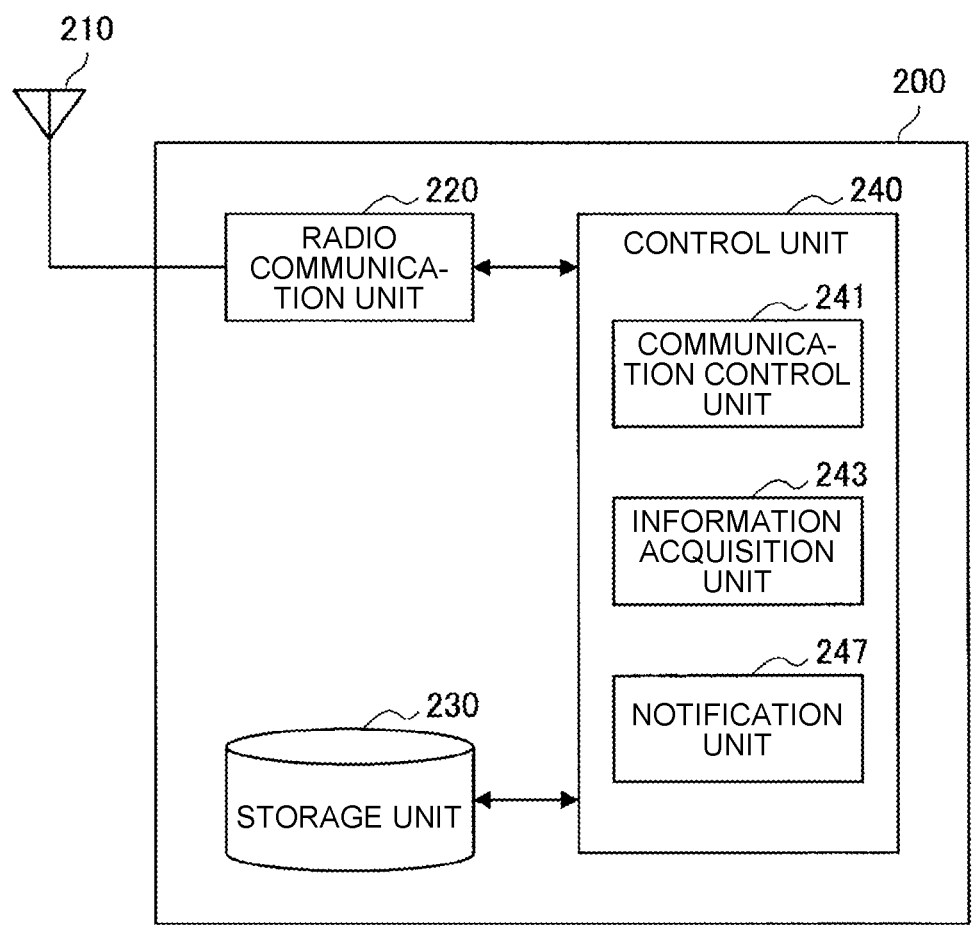
FIG. 5 is a block diagram illustrating an example of a configuration of a terminal device according to the embodiment.

Next, an example of a configuration of the terminal device 200 according to the embodiment of the present disclosure will be described with reference to FIG. 5. FIG. 5 is a block diagram illustrating an example of a configuration of the terminal device 200 according to the embodiment of the present disclosure. As illustrated in FIG. 5, the terminal device 200 includes an antenna unit 210, a radio communication unit 220, a storage unit 230, and a control unit 240.

(1) Antenna Unit 210

The antenna unit 210 radiates the signal output by the radio communication unit 220 to space as a radio wave. Furthermore, the antenna unit 210 converts a radio wave in space into a signal and outputs the signal to the radio communication unit 220.

(2) Radio Communication Unit 220

The radio communication unit 220 transmits and receives signals. For example, the radio communication unit 220 receives a downlink signal from the base station and transmits an uplink signal to the base station.

(3) Storage Unit 230

The storage unit 230 temporarily or permanently stores a program and various data for the operation of the terminal device 200.

(4) Control Unit 240

The control unit 240 provides various functions of the terminal device 200. For example, the control unit 240 includes a communication control unit 241, an information acquisition unit 243, and a notification unit 247. The control unit 240 can further include other components other than these components. That is, the control unit 240 can perform operations other than the operations of these components.

The communication control unit 241 executes various processes related to the control of radio communication with the communication device 100 and another terminal device 200 via the radio communication unit 220.

The information acquisition unit 243 acquires various types of information from the communication device 100 and other terminal devices 200.

The notification unit 247 notifies the communication device 100 and other terminal devices 200 of various types of information.

1.1.3. Configuration Example of Communication Control Device

Figure 6:
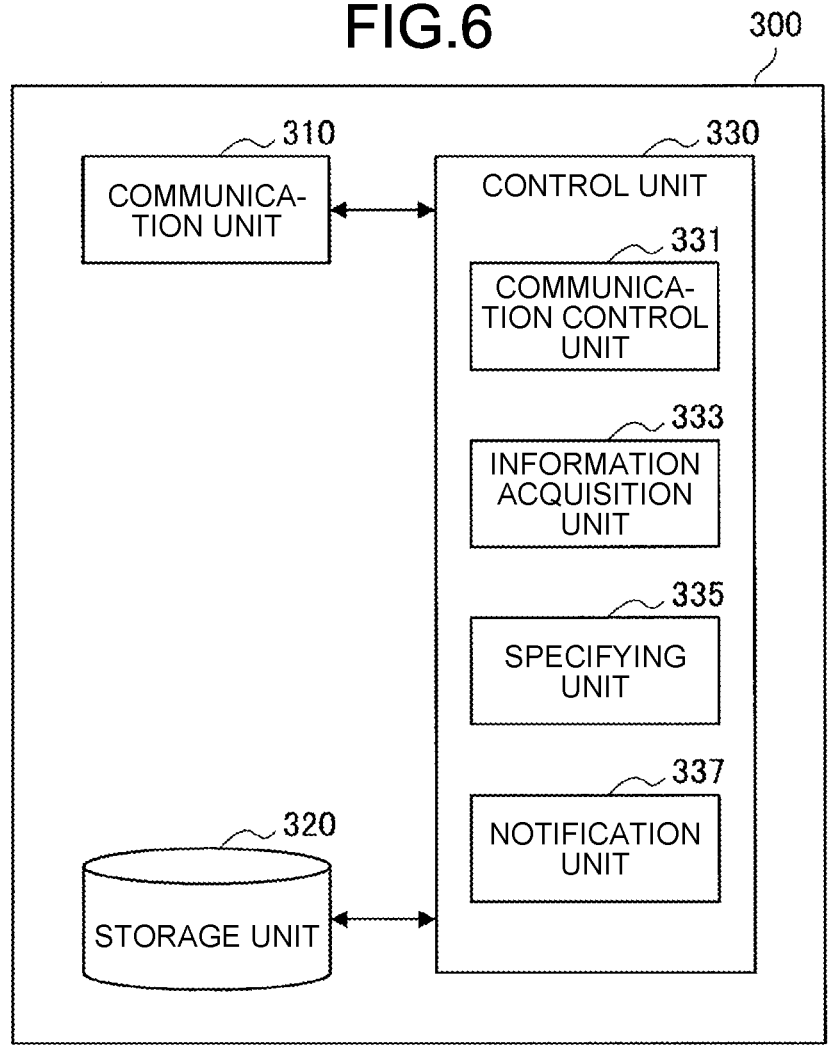
FIG. 6 is a block diagram illustrating an example of a configuration of the communication control device according to the embodiment.

Next, an example of a configuration of the communication control device 300 according to the embodiment of the present disclosure will be described with reference to FIG. 6. FIG. 6 is a block diagram illustrating an example of a configuration of the communication control device 300 according to the embodiment of the present disclosure. As illustrated in FIG. 6, the communication control device 300 includes a communication unit 310, a storage unit 320, and a control unit 330.

(1) Communication Unit 310

The communication unit 310 transmits and receives information. For example, the communication unit 310 transmits information to other devices and receives information from other devices. For example, the other devices include the communication device 100 and the network manager 400 illustrated in FIG. 2. Hereinafter, unless otherwise specified, each of components of the communication control device 300 is supposed to transmit and receive information to and from other devices via the communication unit 310.

(2) Storage Unit 320

The storage unit 320 temporarily or permanently stores a program and various data for the operation of the communication control device 300. As a specific example, the storage unit 320 may store information regarding an operator of the radio system, registration information of the radio system described above, information regarding a spectrum user, and information temporarily output for processing by each of components of the communication control device 300 (for example, a calculation result or the like).

(3) Control Unit 330

The control unit 330 provides various functions of the communication control device 300. For example, the control unit 330 includes a communication control unit 331, an information acquisition unit 333, a specifying unit 335, and a notification unit 337. The control unit 240 can further include other components other than these components. That is, the control unit 330 can perform operations other than the operations of these components.

The communication control unit 331 executes various processes related to control for the communication device 100 illustrated in FIG. 2 to perform radio communication. For example, the communication control unit 331 may execute various processes (for example, control of communication parameters, or the like) related to allocation of at least a part of the frequency band (channel) among communication bands available for radio communication, to the communication device 100.

The information acquisition unit 333 acquires various types of information from the communication device 100 (for example, CBSD to be described below) and other entities (for example, an ESC or a PAL database to be described below, or the like).

The specifying unit 335 specifies a frequency band (channel) that can be allocated to the communication device 100 (for example, CBSD to be described below) based on information acquired from other entities (for example, the ESC or the PAL database to be described below, or the like).

The notification unit 337 notifies the communication device 100 (for example, CBSD to be described below) and other entities (for example, the PAL database to be described below or the like) of various types of information.

1.2. Terms Related to Spectrum Sharing

Next, terms related to spectrum sharing used in the present disclosure will be described. Note that, in the present disclosure, various descriptions will be given assuming a dynamic spectrum sharing (Dynamic Spectrum Access) environment. As a representative example, the present disclosure will describe a mechanism defined in the United States FCC Rule Part 96: Citizens Broadband Radio Service (hereinafter, also referred to as "CBRS").

Figure 7:
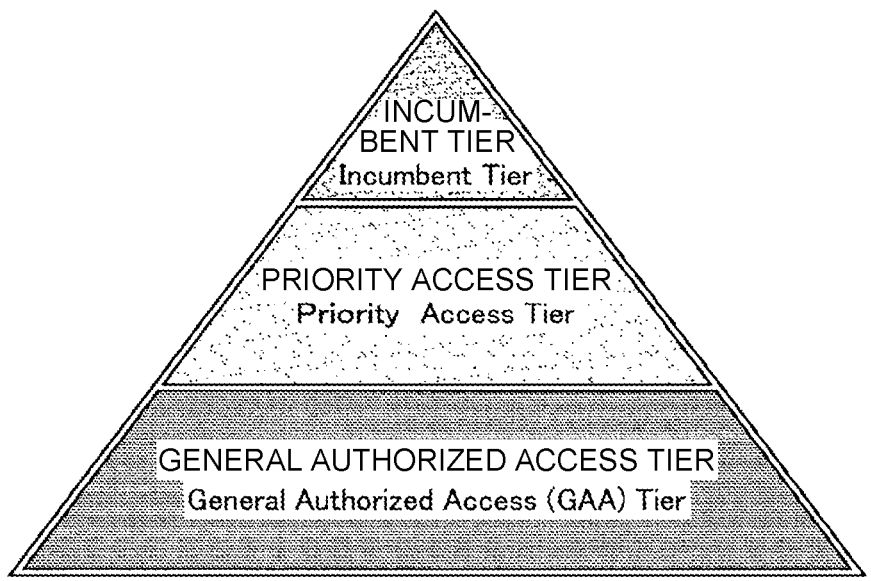
FIG. 7 is a diagram illustrating an example of groups into which users are classified for spectrum sharing.

For example, FIG. 7 is a diagram illustrating an example of groups into which individual users are classified for spectrum sharing. In the CBRS, as illustrated in FIG. 7, each of the users as a target of spectrum sharing is classified into one of three groups illustrated in FIG. 7. Such a group is referred to as a "tier". Specifically, the example illustrated in FIG. 7 has specified, as the three groups, an Incumbent Tier, a Priority Access Tier, and a General Authorized Access (GAA) Tier.

The Incumbent Tier is a group of incumbent users of the shared frequency band. Examples of incumbent users in the CBRS include: the Department of Defense (DOD), fixed satellite service operators, and Grandfathered Wireless Broadband Licensees (GWBL). The Incumbent Tier is not required to avoid or suppress interference to lower priority tiers, namely, the Priority Access Tier and the General Authorized Access Tier. In addition, the Incumbent Tier is protected against the interference from the Priority Access Tier and the General Authorized Access Tier. That is, the user of the Incumbent Tier can use the frequency band without considering the presence of other groups. Note that a user belonging to an Incumbent Tier, that is, an incumbent user of a shared frequency band corresponds to an example of a "primary communication service". In contrast, a user belonging to either the Priority Access Tier or the General Authorized Access Tier corresponds to an example of a "secondary communication service", and a communication device that provides the secondary communication service corresponds to an example of a "secondary use communication device". That is, a communication device (for example, a base station or the like) that performs secondary use of a part of the frequency bands used by the primary communication service can correspond to the secondary use communication device.

The Priority Access Tier is a group of users having a license referred to as a Priority Access License (PAL). The Priority Access Tier is required to avoid or suppress interference to a higher priority tier, namely, the Incumbent Tier, but is not required to avoid or suppress interference to the lower priority tier, namely, the General Authorized Access Tier. In addition, the Priority Access Tier is not protected against the interference from the higher priority tier, namely, the Incumbent Tier, but is protected against the interference from the lower priority tier, namely, the General Authorized Access Tier.

The General Authorized Access Tier (GAA Tier) is a group of other users, that is, users not belonging to any of the Incumbent Tier or the Priority Access Tier. The General Authorized Access Tier is required to avoid or suppress interference to the higher priority tiers, namely, the Incumbent Tier and the Priority Access Tier. In addition, the General Authorized Access Tier is not protected against the interference from the higher priority tiers, namely, the Incumbent Tier and the Priority Access Tier. That is, the General Authorized Access Tier corresponds to a "tier" that is legislatively required to allow opportunistic spectrum use.

Note that the above is merely an example. In application of the technology according to the present disclosure, the definition of the concept (that is, setting regarding priority) corresponding to "tier" is not necessarily limited to the above example. As a specific example, the CBRS typically has a three-tier structure, but may have a two-tier structure. Typical examples of this include two-tier structures such as Licensed Shared Access (LSA) and TV band White Space (TVWS). The LSA has employed a structure equivalent to the above-described combination of the Incumbent Tier and the Priority Access Tier. The TVWS has employed a structure equivalent to the combination of the Incumbent Tier and the General Authorized Access Tier. In addition, there may be a structure having four or more tiers. As a specific example, there may be the setting in which an intermediate tier corresponding to a Priority Access Tier is divided into a plurality of tiers, and the plurality of tiers are further prioritized, or the like. In addition, similarly, it is allowable to have the setting in which the General Authorized Access Tier is divided into a plurality of tiers, and the plurality of tiers are further prioritized, or the like.

In addition, other radio systems may be set as the primary system according to the applied frequency band. As a specific example, the primary system may be a radio system such as TV broadcasting, a Fixed System (FS), a weather radar, a radio altimeter, or a Communications-based Train Control system. Any radio system other than these may be treated as the primary system.

In addition, the relationship between the primary system and the secondary system is not necessarily limited to the example of the spectrum sharing environment described above. In typical spectrum sharing, an incumbent system that uses a target band is referred to as a primary system, and a secondary user is referred to as a secondary system. However, when the technology according to the present disclosure is applied to an environment other than a spectrum sharing environment, at least a part of terms may be replaced with other terms. For example, a macro cell in HetNet may be defined as the primary system, and a small cell or a relay station may be defined as the secondary system. Alternatively, the base station may be defined as the primary system, and a relay UE or a vehicle UE that implements D2D or V2X existing in the coverage may be defined as the secondary system. The base station is not limited to a static type, and may be a portable type or a mobile type. In such a case, the communication control device 300 according to an embodiment of the present disclosure may be included in a base station, a relay station, a relay UE, for example.

Also, in the present disclosure, the term "frequency" or "spectrum" may be replaced by other terms. As a specific example, the term "frequency" or "spectrum" may be replaced with terms such as "resource", "resource block", "resource element", "channel", "component carrier", "carrier", "subcarrier" and "Bandwidth Part (BWP)" or terms having similar meanings.

2. DESCRIPTION OF VARIOUS PROCEDURES

In this chapter, various procedures that can occur between entities in the system model will be described.

2.1. Registration Procedure

The registration procedure corresponds to a procedure for registering device parameters related to a communication device onto a communication control device. Typically, a registration procedure is started when a communication device or one or more communication systems including a plurality of communication devices notify the communication control device of a registration request including the device parameters.

2.1.1. Details of Required Parameters

An example of the device parameters in the present disclosure will be described below.
Information specific to communication device
Location information
Antenna information
Wireless interface information
Legal Information
Installer information The above is merely an example, of course, and thus, information other than the above may be treated as the device parameter, for example.

The information specific to the communication device can correspond to information by which the communication device can be specified, information regarding hardware of the communication device, or the like. The information specific to the communication device can include, for example, a serial number, a product model number, or the like.

The information by which the communication device can be specified can correspond to communication device user information, a communication device serial number, or the like. Examples of assumable communication device user information include a user ID or a call sign. The user ID may be independently generated by the communication device user or may be issued in advance by the communication control device.

The information regarding the hardware of the communication device can include transmission power class information, or manufacturer information, for example. For example, FCC C.F.R Part 96 defines two classes of Category A and Category B, and the transmission power class information can include at least one of the two classes. Furthermore, 3GPP TS 36.104 and TS 38.104 define some classes of eNodeB and gNodeB, and the classes can also be used as the transmission power class information.

The information regarding the software of the communication device can include, for example, version information, a build number, or the like regarding an execution program that describes processes necessary for interaction with the communication control device. Furthermore, the information regarding the software of the communication device may also include version information, a build number, or the like of software needed for operation as the communication device.

The information related to the location typically corresponds to information by which the geographical location of the communication device can be specified. The information related to the location can include, for example, coordinate information acquired by a positioning function represented by a Global Positioning System (GPS), Beidou, a Quasi-Zenith Satellite System (QZSS), Galileo, or an Assisted Global Positioning System (A-GPS). In addition, typically, information regarding latitude, longitude, altitude, and a positioning error can be included in the information regarding the location. Furthermore, as another example, the information regarding the location may include location information registered in an information management device managed by a National Regulatory Authority (NRA) or its agency. Furthermore, as another example, the information regarding the location may include coordinates of an X-axis, a Y-axis, and a Z-axis with a specific geographical location as an origin. In addition, as the information regarding the location, an identifier indicating the outdoors or the indoors can be assigned together with the above-described coordinate information.

Furthermore, the information regarding the location may be information indicating an area in which the communication device is located. For example, information defined by the government such as a postal code, a postal address, or the like may be used as the information regarding the location. Furthermore, as the information regarding the location, for example, the region may be indicated by a set of three or more geographic coordinates. The information indicating such a region may be provided together with the above-described coordinate information, for example.

Furthermore, in a case where the communication device is located indoors, information indicating a floor of a building may be assigned to the information regarding the location. For example, information such as a floor number and an identifier indicating the ground/underground may be assigned to the information regarding the location. Furthermore, as another example, information indicating a further closed space inside the building, such as a room number and a room name in the building, may be assigned to the information regarding the location.

Typically, the positioning function is desirably provided by a communication device. However, it is not always possible to acquire the location information satisfying the required accuracy depending on the performance of the positioning function or the installation location. Therefore, the positioning function may be used by the installer. When the positioning function is used by the installer, it is desirable that the location information measured by the installer is written in the communication device.

Typically, the antenna information corresponds to information indicating performance, a configuration, or the like of an antenna included in the communication device. Typically, for example, the antenna information can include information such as an antenna installation height, a tilt angle (Downtilt), a horizontal direction (Azimuth), an aim (Boresight), an antenna peak gain, and an antenna model.

The antenna information can also include information regarding a formable beam. For example, the antenna information can include information such as a beam width, a beam pattern, and analog/digital beamforming capabilities.

Furthermore, the antenna information can also include information regarding performance and a configuration of Multiple Input Multiple Output (MIMO) communication. For example, the antenna information can include information such as the number of antenna elements and the maximum number of spatial streams. In addition, the antenna information can also include codebook information to be used, weight matrix information (a unitary matrix obtained by Singular Value Decomposition (SVD), Eigen Value Decomposition (EVD), Block Diagonalization (BD), or the like, a Zero-Forcing (ZF) matrix, or a Minimum Mean Square Error (MMSE) matrix), or the like. In addition, in a case where a configuration such as Maximum Likelihood Detection (MLD) requiring a nonlinear operation is provided, the antenna information can include information regarding the configuration.

The antenna information may include Zenith of Direction, Departure (ZoD). The ZoD is a type of radio wave arrival angle. The ZoD may be estimated by another communication device based on a radio wave radiated from an antenna of the communication device. In this case, the communication device may be a base station, a terminal device that operates as an access point, a device that performs D2D communication, a moving relay base station, or the like. ZoD can be estimated by a radio wave arrival direction estimation technology such as Multiple Signal Classification (MUSIC) or Estimation of Signal Propagation via Rotation Invariance Techniques (ESPRIT), for example. In addition, ZoD can be used by the communication control device as measurement information.

The wireless interface information is typically information indicating a wireless interface technology included in the communication device. For example, the wireless interface information can include identifier information indicating a standard technology such as: a technology used in GSM (registered trademark), CDMA 2000, UMTS, E-UTRA, 5G NR, or a further next generation cellular system; a derivative technology based on 3GPP, such as MulteFire or LTE-Unlicensed (LTE-U); a Metropolitan Area Network (MAN) such as WiMAX (registered trademark) or WiMAX 2+; and a wireless LAN based on IEEE 802.11. In addition, a version number or a release number of a technical specification that defines the technology as described above can also be assigned to the wireless interface information. Note that the information assigned to the wireless interface information is not necessarily information regarding the standard technology, and may be, for example, information indicating a proprietary radio technology.

In addition, the wireless interface information can also include frequency band information related to frequency bands supported by the communication device. The frequency band information can be expressed by, for example, one or more combinations of an upper limit frequency and a lower limit frequency, one or more combinations of a center frequency and a bandwidth, one or more 3GPP Operating Band numbers, or the like.

The frequency band information related to the frequency bands supported by the communication device can further include capability information regarding Carrier Aggregation (CA) or channel bonding. The capability information can include combinable band information, for example. Furthermore, the capability information regarding carrier aggregation can include information regarding a band desired to be used as a Primary Component Carrier (PCC) or a Secondary Component Carrier (SCC), for example. The capability information regarding carrier aggregation can also include the number of CCs that can be aggregated at the same time.

The frequency band information supported by the communication device may include information indicating the radio wave utilization priority such as PAL and GAA.

The wireless interface information can also include modulation scheme information indicating a modulation scheme supported by the communication device. For example, representative examples of wireless interface information can include: information indicating a primary modulation scheme such as frequency shift keying (FSK), n-value phase shift keying (PSK) (n is 2, 4, 8, or the like), and n-value quadrature amplitude modulation (QAM) (n is 4, 16, 64, 256, or the like); and information indicating a secondary modulation scheme such as Orthogonal Frequency Division Multiplexing (OFDM), DFT spread OFDM (DFT-s-OFDM), or a Filter Bank Multi Carrier (FBMC).

The wireless interface information can also include error correction code information. The error correction code information can include, for example, capabilities such as a turbo code, a low density parity check (LDPC) code, and a polar code, or information regarding a coding rate to be applied.

The modulation scheme information and the error correction code information can also be expressed by a Modulation and Coding Scheme (MCS) index as another aspect.

In addition, the wireless interface information can also include information indicating a function specific to each of radio technologies supported by the communication device. For example, a representative example of wireless interface information is information related to Transmission Mode (TM) defined in LTE. In addition, those having two or more modes for a specific function can be included in the wireless interface information as in the TM. In addition, even in a case where there are no two or more modes in the technical specification, in a case where the communication device supports a function that is not essential in the specification, information indicating the function can also be included in the wireless interface information.

The wireless interface information can also include information related to the radio access technology (RAT) supported by the communication device. The wireless interface information can include, for example, information indicating an Orthogonal Multiple Access (OMA) scheme, a Non Orthogonal Multiple Access (NOMA) scheme, an opportunistic access scheme, or the like, as information regarding the radio access technology. Examples of the Orthogonal Multiple Access scheme include Time Division Multiple Access (TDMA), Frequency Division Multiple Access (FDMA), and Orthogonal Frequency Division Multiple Access (OFDMA). Furthermore, examples of the Non Orthogonal Multiple Access scheme include Power Division Multiple Access (PDMA, a representative example of which is a technique implemented by a combination of Superposition Coding (SPC) and Successive Interference Canceller (SIC)), Code Division Multiple Access (CDMA), Sparse Code Multiple Access (SCMA), Interleaver Division Multiple Access (IDMA), and Spatial Division Multiple Access (SDMA). Examples of the opportunistic access scheme include Carrier Sense Multiple Access/Collision Avoidance (CSMA/CA) and Carrier Sense Multiple Access/Collision Detection (CSMA/CD).

In addition, the wireless interface information can also include information regarding a duplex mode supported by the communication device. Typical examples of the information regarding the duplex mode include Frequency Division Duplex (FDD), Time Division Duplex (TDD), and Full Duplex (FD). In a case where information regarding TDD is included as the wireless interface information, TDD Frame Configuration information used/supported by the communication device can be assigned. In addition, the wireless interface information may include information related to the duplex mode for each of frequency bands indicated by the frequency band information.

The wireless interface information can also include information related to a transmission diversity method supported by the communication device. Examples of the transmission diversity method include Space Time Coding (STC).

The wireless interface information can also include guard band information. The guard band information can include information regarding a guard band size defined in a standard, for example. As another example, the guard band information may include information regarding a guard band size desired by the communication device.

The legal information typically corresponds to information related to regulations that the communication device must comply with, which are defined by radio administration organizations in different countries and regions or equivalent organizations, authentication information acquired by the communication device, or the like. The information regarding the regulation typically includes, for example, upper limit value information of out-of-band emission, information regarding a blocking characteristic of the receiver, or the like. The authentication information can typically include, for example, type approval information (FCC ID, Technical Standard Conformance Certificate, etc.), legal/regulatory information (for example, FCC regulation number, ETSI Harmonized Standard number, or the like) provided as a standard for acquisition of authentication, or the like.

Among the legal information, information related to a numerical value may be substituted by information defined in the specification of the wireless interface technology. For example, the upper limit value of the out-of-band emission may be derived for application by using an Adjacent Channel Leakage Ratio (ACLR) instead of the upper limit value information of the out-of-band emission. In addition, the ACLR itself may be used as necessary. Furthermore, Adjacent Channel Selectivity (ACS) may be used instead of the blocking characteristic. In addition, these may be used in combination, or an Adjacent Channel Interference Ratio (ACIR) may be used.

The installer information can include information by which a person who installs the communication device (installer) can be specified, unique information linked with the installer, or the like. For example, in Literature 2 described below, Certified Professional Installer Registration ID (CPIR-ID) and a CPI name are disclosed as information by which the installer can be specified. In addition, for example, a postal address (mailing/contact address), an e-mail address, a telephone number, a Public Key Identifier (PKI), or the like, are disclosed as unique information linked with the installer. The above is merely an example, and the present invention is not limited to the above example, and other information regarding the installer may be included in the installer information as necessary.

Literature 2: WINNF-TS-0016-V1.2.3 Signaling Protocols and Procedures for Citizens Broadband Radio Service (CBRS): Spectrum Access System (SAS)-Citizens Broadband Radio Service Device (CBSD) Interface Technical Specification 2.1.1.1. Supplement of Required Parameters In the registration procedure, depending on the embodiment, it is assumed that not only the device parameters related to the communication device but also the device parameter related to the terminal would be required to be registered onto the communication control device. In such a case, the term "communication device" described in "2.1.1 Details of required parameters" may be replaced with a term "terminal" or a similar term in application. In addition, a parameter specific to "terminal" that is not described in "2.1.1 Details of required parameters" may also be treated as a required parameter in the registration procedure. An example of this is a user equipment (UE) category defined in 3GPP.

2.1.2. Details of Registration Process

The communication device or one or more communication systems including a plurality of communication devices generates a registration request message using the device parameter and notifies the communication control device of the registration request message.

Here, in a case where the device parameter includes installer information, a process of falsification prevention or the like may be applied on the registration request by using the installer information. In addition, an encryption process may be applied on a part or all of the information included in the registration request. Specifically, for example, it is possible to apply a process in which a public key specific to the installer is shared in advance between the installer and the communication control device, and the installer performs encryption on information using a secret key. Examples of the target of the encryption include sensitive security information such as location information.

Furthermore, as disclosed in Literature 2 described above, the installer may directly write the location information into the communication control device, for example.

After receiving the registration request, the communication control device performs a communication device registration process, and returns a registration response to a transmission source (for example, the communication device) of the registration request according to a result of the process. When there is no lack or abnormality of information necessary for registration, the communication control device records target information in the storage unit, and notifies the transmission source of the registration request (for example, the communication device) of normal completion. In contrast, when there is a lack or abnormality of information necessary for registration, the communication control device notifies the transmission source of the registration request of the registration failure. In the case of normal completion of registration, the communication control device may assign an ID to each of the communication devices and may notify the communication devices of the ID information by enclosing the ID information at the time of response. In a case where the registration fails, typically, a communication device, one or more communication systems including a plurality of communication devices, or an operator (for example, a mobile network operator or an individual) or an installer of these communication devices would perform correction or the like of the registration request so as to attempt the registration procedure until normal completion.

Note that the registration procedure is executed a plurality of times in some cases. Specifically, for example, when the location information is changed beyond a predetermined standard due to movement of the communication device, accuracy improvement, or the like, the registration procedure can be executed again. The predetermined standard is typically defined by a legal system. For example, in 47C.F.R Part 15, the Mode II personal/portable white space device is required to access the database again when the location information changes by 100 meters or more.

2.2 Available Spectrum Query Procedure

The available spectrum query procedure corresponds to a procedure used by a communication device or a communication system representing a plurality of communication devices to make a query about available spectrum information to a communication control device. Typically, the procedure is started by the notification made by the communication device or a communication system representing a plurality of communication devices to the communication control device of a query request including information by which the communication device can be specified.

Here, the available spectrum information typically corresponds to information indicating a spectrum that can be safely provided as a secondary use without causing fatal interference to the primary system at the position of the communication device. For example, when a communication device is installed in a secondary use prohibited area such as an exclusion zone in order to protect a primary system using a frequency channel F1, the communication device will not be notified of the frequency channel F1 as an available channel.

In addition, for example, when it is determined that fatal interference is to be given to the primary system even outside the secondary use prohibited area, the frequency channel would not be notified as an available channel in some cases.

In addition, there can be a frequency channel that is not notified as an available channel due to the conditions other than the primary system protection requirement described above. Specifically, in order to avoid interference that can occur between communication devices, there are cases where a frequency channel being used by another communication device existing in the vicinity of the communication device is not notified as an available channel, for example.

In addition, as described above, even in a case corresponding to a situation in which interference can occur in the primary system or another communication device existing in the vicinity, it would be possible to notify the same spectrum as that of the primary system or the communication device in the vicinity as an available channel. In such a case, typically, the maximum allowable transmission power information is included in the available spectrum information. The maximum allowable transmission power is typically expressed by Equivalent Isotropic Radiated Power (EIRP). The above is merely an example, and the present invention is not necessarily limited to the above. For example, the maximum allowable transmission power may be provided by a combination of conducted power and an antenna gain. Furthermore, the antenna gain may be used by setting an allowable peak gain for each of spatial directions.

2.2.1. Details of Required Parameters

Examples of the information by which the communication device can be specified include information specific to the communication device registered at the time of the registration procedure, the above-described ID information, or the like.

Furthermore, the query request can include query requirement information. The query requirement information can include, for example, information indicating a frequency band to be checked for its availability. The query request can also include transmission power information, for example. When confirming information regarding a spectrum at which a desired transmission power can be likely to be used, the communication device or the communication system representing a plurality of communication devices can include transmission power information in the query request, for example. In this case, the query requirement information does not necessarily have to be included in the query request.

The query request can also include a measurement report. The measurement report includes a result of measurement performed by the communication device and/or the terminal. The measurement report can include not only raw data but also processed information, for example. The measurement report can utilize standardized metrics represented by Reference Signal Received Power (RSRP), Reference Signal Strength Indicator (RSSI), and Reference Signal Received Quality (RSRQ), for example.

2.2.2. Details of Available Spectrum Evaluation Process

After receiving the query request, the available spectrum is evaluated based on query requirement information. For example, as described above, the available spectrum can be evaluated in consideration of the primary system, the secondary use prohibited area linked with the primary system, the presence of a nearby communication device, or the like.

As described above, the maximum allowable transmission power information may be derived. Typically, the maximum allowable transmission power information is calculated using allowable interference power information in the primary system or its protection zone, computational reference point information of an interference power level to be experienced by the primary system, registration information of the communication device, a propagation loss estimation model, or the like. Specifically, as an example, the maximum allowable transmission power information is calculated by a formula expressed as (Formula 1) below.

$$P_{MaxTx(dBm)} = I_{Th(dBm)} + PL(d)_{(dB)} \quad \text{(Formula 1)}$$

In (Formula 1) above, $P_{MaxTx(dBm)}$ represents the maximum allowable transmission power. In addition, $I_{Th(dBm)}$ represents allowable interference power. Furthermore, d represents a distance between the reference point and the communication device. In addition, $PL(d)_{(dB)}$ represents a propagation loss at the distance d. Although the antenna gain in the transceiver is not explicitly indicated in the above (Formula 1), the antenna gain may be included in the maximum allowable transmission power information in accordance with the method of expressing the maximum allowable transmission power (EIRP, conducted power, or the like) or the point of reference in the reception power (antenna input point, antenna output point, or the like). The maximum allowable transmission power information may also include a safety margin or the like for compensating for variation due to fading. In addition, feeder loss or the like may be considered as necessary.

In addition, the above (Formula 1) is described on the assumption that a single communication device is an interference source. For example, in a case where aggregated interference from a plurality of communication devices is considered at the same time, a correction value may be added. Specifically, for example, the correction value can be determined based on three types (Fixed/Predetermined, Flexible, Flexible Minimized) of interference margin schemes disclosed in Literature 3 described below.

Literature 3: ECC Report 186, Technical and operational requirements for the operation of white space devices under geolocation approach, CEPT ECC, 2013 January Note that the above (Formula 1) is expressed using logarithms, but may be naturally converted into true numbers in practical use. In addition, all parameters in logarithmic notation described in this specification may be appropriately converted into base in use.

Furthermore, when the above-described transmission power information is included in the query requirement information, the available spectrum can be evaluated by a method different from the above-described example. Specifically, for example, when assuming the use of the desired transmission power indicated by transmission power information, and when an estimated interference level is lower than allowable interference power in the primary system or its protection zone in the use of the transmission power, it is determined that the frequency channel is available, and the communication device is notified of the frequency channel.

Although the example in which the band use condition is calculated based on the other system related information has been described above, the method of deriving the available spectrum information in the technology according to the present disclosure is not necessarily limited to the example described above. For example, similarly to an area of a radio environment map (REM), when there is a predetermined area/space in which a communication device can use a shared band, the available spectrum information may be derived based on the location-related information and the height-related information. Furthermore, for example, even when there is provided a lookup table for associating a location and a height with available spectrum information, the available spectrum information may be derived based on the location-related information and the height-related information.

The evaluation of the available spectrum does not necessarily have to be performed after reception of the query request. For example, after the normal completion of the above-described registration procedure, the communication control device may proactively perform the evaluation without any query request. In such a case, it is allowable to create the REM or the lookup table described in the above example or an information table similar to these.

In any method, the radio wave utilization priority such as PAL or GAA may be evaluated. For example, when information regarding the radio wave utilization priority is included in the registered device parameter or the query requirement, whether the use of the spectrum is acceptable may be determined based on the priority, and notification according to the determination result may be performed. Furthermore, for example, as disclosed in Literature 2 described above, when information related to the communication device (referred to as Cluser List in Literature 2 above) that performs high priority utilization (for example, PAL) has been preliminarily registered onto the communication control device by the user, evaluation may be performed based on the information.

After completion of the evaluation of the available spectrum, the communication control device notifies the communication device of the evaluation result.

The communication device may select a desired communication parameter based on the evaluation result received from the communication control device.

2.3. Spectrum Grant Procedure

A Spectrum Grant Procedure is a procedure for the communication device to receive secondary use permission of a spectrum from the communication control device. Typically, after normal completion of the registration procedure, the communication device or one or more communication systems including a plurality of communication devices notifies the communication control device of a spectrum grant request including information by which the communication device can be specified, whereby the procedure is started. Note that "after normal completion of the registration procedure" also implies that the available spectrum query procedure does not necessarily have to be performed.

The present disclosure assumes that at least the following two types of spectrum grant request methods can be used.
Designation method
Flexible method The designation method is a request method in which the communication device designates at least a frequency band desired to be used or maximum transmission power as a desired communication parameter and requests the communication control device to permit operation based on the desired communication parameter. The above is merely an example, and the designation target as the desired communication parameter is not necessarily limited to the above parameter, and a parameter (modulation scheme, a duplex mode, or the like) specific to the wireless interface technology may be designated. Furthermore, the desired communication parameter may include information indicating radio wave utilization priority such as PAL and GAA.

The flexible method is a request method in which a communication device designates a requirement regarding a communication parameter and requests the communication control device to designate a communication parameter that can achieve secondary use while satisfying the requirement. The requirement for the communication parameter can include a requirement for bandwidth, a desired maximum transmission power, or a desired minimum transmission power. The above is merely an example, and the designation target as the requirement related to the communication parameter is not necessarily limited to the above parameter, and parameters (modulation scheme, a duplex mode, or the like) specific to the wireless interface technology may be designated. Specifically, for example, one or more parameters of TDD Frame Configuration may be selected in advance, and then a requirement regarding the parameter may be designated.

In a case where any of the above-described methods is applied, the measurement report may be included in the request. The measurement report includes a result of measurement performed by the communication device and/or the terminal. The measurement report can include not only raw data but also processed information, for example. The measurement report can utilize standardized metrics represented by Reference Signal Received Power (RSRP), Reference Signal Strength Indicator (RSSI), and Reference Signal Received Quality (RSRQ), for example.

2.3.1. Details of Spectrum Grant Process

After receiving the spectrum grant request, the communication control device performs a spectrum grant process based on the spectrum grant request method. For example, using the above-described method, it is possible to perform the spectrum grant process in consideration of the primary system, the secondary use prohibited area linked with the primary system, the presence of a nearby communication device, or the like.

When the flexible method is used, the maximum allowable transmission power information may be derived using the above-described method. Typically, the maximum allowable transmission power is calculated by using allowable interference power information in the primary system or its protection zone, calculation reference point information of an interference power level to be experienced by the primary system, communication device registration information, and a propagation loss estimation model. Specifically, the maximum allowable transmission power is calculated by a mathematical expression expressed as (Formula 2) below.

$$P_{MaxTx(dBm)} = I_{Th(dBm)} + PL(d)_{(dB)}$$

In the above (Formula 2), $P_{MaxTx(dBm)}$ represents the maximum allowable transmission power. In addition, $I_{Th(dBm)}$ represents allowable interference power. Furthermore, d represents a distance between the reference point and the communication device. In addition, $PL(d)_{(dB)}$ represents a propagation loss at the distance d. Although the antenna gain in the transceiver is not explicitly indicated in the above (Formula 2), the expression may be transformed in use in accordance with the method of expressing the maximum allowable transmission power (EIRP, conducted power, or the like) or the point of reference in the reception power (antenna input point, antenna output point, or the like). The maximum allowable transmission power information may also include a safety margin or the like for compensating for variation due to fading. In addition, feeder loss or the like may be considered as necessary.

In addition, the above (Formula 2) is described on the assumption that a single communication device is an interference source. For example, in a case where aggregated interference from a plurality of communication devices is considered at the same time, a correction value may be added. Specifically, for example, the correction value can be determined based on three types of schemes (Fixed/Predetermined, Flexible, Flexible Minimized) disclosed in Literature 3 described above.

Various models can be used as the propagation loss estimation model. When a model is designated for individual applications as a propagation loss estimation model, it is desirable to use the designated model. For example, in above-described Literature 1, a propagation loss model such as Extended Hata (eHATA) or Irregular Terrain Model (ITM) is adopted for individual applications. As a matter of course, at implementation of the technology according to the present disclosure, the propagation loss model would not need to be limited to the example described above.

In a predetermined application, when a model is not designated, the model may be selectively used as necessary. As a specific example, it is possible to selectively use a model in a manner in which a model that calculates a small loss, such as a free space loss model, will be used when the interference power to another communication device is estimated, while a model that calculates a large loss will be used when the coverage of the communication device is estimated. Naturally, the models may be used according to different criteria.

Furthermore, in a case where the designation method is used, the spectrum grant process can be performed using the above-described method. As a specific example, when the interference level estimated on the assumption that the communication device uses the desired transmission power indicated by the transmission power information is less than the allowable interference power in the primary system or its protection zone, it is determined that the use of the frequency channel can be permitted, and the determination result is notified to the communication device.

In any method, the radio wave utilization priority such as PAL or GAA may be evaluated. For example, when information regarding the radio wave utilization priority is included in the registered device parameter or the query requirement, whether the use of the spectrum is acceptable may be determined based on the priority, and notification according to the determination result may be performed. Furthermore, for example, as disclosed in Literature 2 described above, when information related to the communication device (referred to as Cluser List in Literature 2 above) that performs high priority utilization (for example, PAL) has been preliminarily registered onto the communication control device by the user, evaluation may be performed based on the information.

The spectrum grant process does not necessarily have to be performed at the reception of the spectrum grant request. For example, after normal completion of the registration procedure described above, the communication control device may proactively perform the spectrum grant process without the spectrum grant request. Furthermore, for example, the spectrum grant determination process may be performed at regular intervals. In such a case, an REM, a lookup table, or an information table similar thereto may be created as an example.

2.4. Spectrum Use Notification/Heartbeat

The Spectrum use notification/heartbeat corresponds to a procedure for a communication device or a communication system representing a plurality of communication devices to notify a communication control device of spectrum use based on a communication parameter allowed to be used in the spectrum grant procedure. Typically, the procedure is started by the notification made by the communication device or a communication system representing a plurality of communication devices to the communication control device of a notification message including information by which the communication device can be specified.

The procedure of the spectrum use notification/heartbeat is desirably performed periodically until the use of the spectrum is rejected from the communication control device. After normal completion of the procedure, the communication device may start or continue radio wave transmission.

After receiving the spectrum use notification/heartbeat, the communication control device may determine whether the start/continuation of the radio wave transmission is allowable. Examples of the determination method include a method based on confirmation of the spectrum use information of the primary system. Specifically, the communication control device can determine whether to permit or refuse the start/continuation of the radio wave transmission based on a change in the used spectrum of the primary system, a change in the spectrum use status of the primary systems which do not use the radio wave on a regular basis (for example, in-ship radar), or the like.

In the procedure of the spectrum use notification/heartbeat, a communication parameter reconfiguration command may be sent from the communication control device to the communication device. Typically, the communication parameter reconfiguration command can be executed in response to the spectrum use notification/heartbeat. For example, recommended communication parameter information can be provided from the communication control device to the communication device.

2.5. Supplement to Various Procedures

Here, the various procedures described above do not necessarily have to be individually implemented as described below. For example, a procedure corresponding to two different procedures may be realized by defining a third procedure having roles of the two different procedures. Specifically, for example, the registration request and the available spectrum information query request may be integrally notified. Furthermore, for example, the spectrum grant procedure and the spectrum use notification/heartbeat may be integrally performed. As a matter of course, not limited to these combinations, three or more procedures may be defined as one procedure. Furthermore, the above-described various procedures may be separately performed.

Furthermore, in a case where the technology according to the present disclosure is applied for the purpose of spectrum sharing with an incumbent system, it would be desirable that appropriate procedures or equivalent procedures are selected or used based on the radio law related to the frequency band in a country or region in which the technology is implemented. For example, in a case where registration of a communication device is required to use a specific frequency band in a specific country or region, it is desirable to perform a procedure related to the registration.

Furthermore, the expression of "acquiring information" or an expression equivalent thereto in the present disclosure does not necessarily mean only acquiring according to the procedure described above. For example, even with a description of use of the location information of the communication device in the available spectrum evaluation process, it is not always necessary to use the information acquired in the registration procedure. For example, in a case where the location information is included in the available spectrum query procedure request, the location information may be used. In other words, the expression "acquiring information" or its equivalent expressions in the present disclosure mean that the described parameter may be included in other procedures within the scope of the present disclosure and within the scope of technical feasibility.

Furthermore, information that can be included in the response from the communication control device to the communication device described in the above procedure can be notified by using push notification. As a specific example, the available spectrum information, the recommended communication parameter information, the radio wave transmission continuation/refusal notification, or the like may be notified by push notification.

2.6. Various Procedures Regarding Terminal

Basically, individual procedures described in "3.1 Registration procedure" to "3.4 Spectrum use notification/heartbeat" are also applicable to a terminal. Note that the terminal has mobility unlike the communication device. That is, the location information of the terminal can be dynamically updated. Depending on the legal system, when the change in the location information is a certain level or more, re-registration to the communication control device would be required in some cases. Accordingly, in an operation mode defined by the Office of Communication (Ofcom) (refer to Literature 4 below), the following two types of communication parameters are defined.

Specific Operational Parameters
Generic Operational Parameters
Literature 4: White Space Database Provider (WSDB) Contract, available at https://www.ofcom.org.uk/_data/assets/pdf_file/0026/84077/white_space_database_contract_for_operational_use_of_wsds.pdf The Specific Operational Parameters are defined as "operational parameters unique to a specific slave White Space Device (WSD)" in Literature 4 described above. In other words, the Specific Operational Parameter corresponds to a communication parameter calculated by using a device parameter of a slave WSD corresponding to a terminal. The Specific Operational Parameter is characterized in that the parameter is calculated by the White Space Database (WSDB) by using the location information of the slave WSD.

From the above characteristics, it is assumed that the Specific Operational Parameter is suitable for a low-mobility or statically installed terminal.

The Generic Operational Parameters are defined as "Operational Parameters that any Slave WSD within the coverage area of a given Master WSD (corresponding to the communication device) may use" in Literature 4. The Generic Operational Parameter is characterized in that the parameter is calculated by the WSDB without using the location information of the slave WSD.

From the above characteristics, it is assumed that the Generic Operational Parameter is suitable for a high-mobility terminal.

The information for the terminal as described above can be provided by unicast or broadcast from the communication device. For example, the information for the terminal is provided by using a broadcast signal represented by a Contact Verification Signal (CVS) defined in FCC rule Part 15 Subpart H. Furthermore, as another example, the information for the terminal may be provided by a broadcast signal specific to a wireless interface. Specifically, the information for the terminal may be provided by using a Physical Broadcast Channel (PBCH) or NR-PBCH used in LTE or 5G NR, for example.

2.7. Procedure Occurring Between Communication Control Devices

2.7.1. Information Exchange

A communication control device can exchange management information with another communication control device. For example, the following information is desirably exchanged between the communication control device and the other communication control device.

Communication device registration information
Communication device communication parameter information
Area information The communication device registration information typically corresponds to a device parameter of a communication device registered to the communication control device in the registration procedure. Note that, when a plurality of communication control devices exists, there would be no need to exchange all the information registered in each of the communication control devices. For example, information that might correspond to personal information would not need to be exchanged between a plurality of communication control devices. Furthermore, when the communication device registration information is exchanged, information subjected to processing such as encryption or obfuscation may be exchanged. For example, information converted into a binary value or information signed using an electronic signature mechanism may be exchanged between a plurality of communication control devices.

The communication device communication parameter information typically corresponds to information related to a communication parameter currently used by the communication device. The communication device communication parameter information desirably includes, for example, information indicating a spectrum used and transmission power. Naturally, the communication device communication parameter information may include other communication parameters.

The area information typically corresponds to information indicating a predetermined geographical zone. The area information can include zone information of various attributes in various modes.

For example, the area information may include protection zone information of a communication device to be a high priority secondary system such as PAL Protection Area (PPA) disclosed in Literature 5 described below. Area information in this case can be expressed by a set of three or more geographical coordinates, for example. Furthermore, for example, in a case where a plurality of communication control devices can refer to a common external database, the area information can be expressed by an ID indicating the information exemplified above.

Literature 5: WINNF-TS-0096-V1.3.1 Signaling Protocols and Procedures for Citizens Broadband Radio Service (CBRS): Spectrum Access System (SAS)-SAS Interface Technical Specification Furthermore, for example, the area information may include information indicating the coverage of the communication device. The area information in this case can also be expressed by a set of three or more geographical coordinates, for example. Furthermore, for example, the area information can also be expressed by information indicating a radius size when assuming a circle with the geographical location of the communication device as an origin. Furthermore, for example, in a case where a plurality of communication control devices can refer to a common external database, the area information can be expressed by an ID indicating the information exemplified above.

Furthermore, as another aspect, the area information can include information related to an area section determined in advance by an administration or the like. Specifically, for example, it is possible to indicate a certain region by indicating the postal address as the area information. Furthermore, for example, a license area or the like can be similarly expressed as the area information.

Furthermore, as still another aspect, the area information does not necessarily have to be defined to represent a planar area, and may be defined to represent a three-dimensional space. For example, the area information may be expressed using a spatial coordinate system. Furthermore, for example, information indicating a predetermined closed space, such as a floor number of a building, a floor, a room number, or the like, may be used as the area information.

These pieces of information can be exchanged by using various methods. Examples of the methods will be described below.

ID designation method
Period designation method
Zone designation method
Dump method The ID designation method is a method of acquiring information corresponding to an ID given in advance to specify information managed by the communication control device, by using the ID. For example, here is an assumable exemplary case where a communication control device 300-1 manages a communication device with ID: AAA. In this case, a communication control device 300-2 designates the ID: AAA and makes an information acquisition request to the communication control device 300-1. After receiving the request, the communication control device 300-1 searches for information corresponding to the designated ID: AAA, and then notifies the communication control device 300-2 of the registration information and the communication parameter information of the corresponding communication device, as a response.

The period designation method is a method of designating a specific period, and exchanging information satisfying a predetermined condition during the period.

Examples of the predetermined condition include a condition regarding whether information is updated. For example, in a case where acquisition of communication device information in a specific period is designated by a request, registration information regarding a communication device newly registered in the period or registration information of a communication device whose communication parameter has been changed, together with communication parameter information, can be notified as a response.

Furthermore, examples of the predetermined condition include a condition regarding whether the communication control device has recorded predetermined information. For example, in a case where acquisition of the communication device information in a specific period is designated by the request, the registration information of the communication device recorded by the communication control device in the period and the communication parameter information can be notified as the response. In addition, the latest information in the period may be notified. In addition, the update history may be notified for each piece of information to be notified.

The zone designation method is a method of designating a specific zone, thereby exchanging information belonging to the zone. For example, in a case where acquisition of communication device information in a specific zone is designated by a request, registration information of a communication device installed in the zone or communication parameter information can be notified as a response.

The dump method is a method of providing all information recorded by the communication control device. For example, it is desirable that information related to the communication device and area information are provided by the dump method.

Note that the above description of the information exchange between the communication control devices corresponds to the procedure based on a pull system. That is, the information corresponding to the parameter designated by the request is notified as a response, and as an example, the information exchange can be implemented by using an HTTP GET method. Nevertheless, the information exchange between the communication control devices according to the present disclosure is not necessarily limited to the pull system, and information may be actively provided to another communication control device by a push system. The situation exchange based on the push system can be implemented by using an HTTP POST method as an example.

2.7.2. Command/request Procedures

The communication control device may exchange a command or a request with another communication control device. Specific example of this is reconfiguration of communication parameters of the communication device. For example, when it is determined that the communication device 100-1 managed by the communication control device 300-1 is experiencing a large amount of interference from the communication device 100-2 managed by the communication control device 300-2, the communication control device 300-1 may request the communication control device 300-2 to change the communication parameter of the communication device 100-2.

In addition, another example is reconfiguration of area information. For example, when incompletion is found in calculation of the coverage information and the protection zone information regarding the communication device 100-2 managed by the communication control device 300-2, the communication control device 300-1 may request the communication control device 300-2 to reconfigure the area information. The above is an example and the area information reconfiguration request may be made for various reasons other than the above example.

3. Technical Problems

Figure 8:
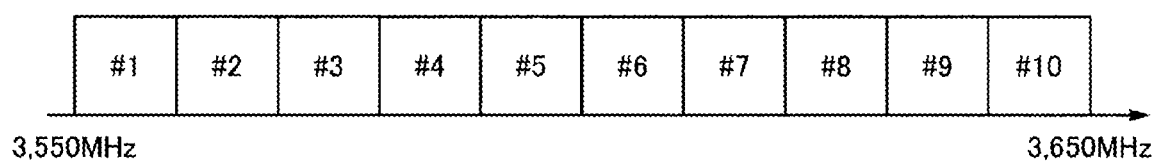
FIG. 8 is a diagram illustrating an example of a CBRS band that can be used by exercising PAL.

Next, technical problems of a system according to an embodiment of the present disclosure will be described. According to C.F.R Part 96, the CBRS band available by a Priority Access Licensee by exercising the Priority Access License (PAL) is defined as the range of 3550-3650 MHz, prescribing that 10 MHz channels are to be allocated per one PAL. For example, FIG. 8 is a diagram illustrating an example of a CBRS band that can be used by exercising PAL. In addition, it is prescribed that no more than seven PALs shall be issued in any given License Area. Therefore, it can be seen that there are at least three channels available per License Area.

On the other hand, frequency bands ranging 3550-3650 MHz are supposed to be used for application of an in-ship radar by Department of Defense (DOD) which is an incumbent user. For example, according to Literature 1 described above, a Dynamic Protection Area (DPA) is provided as a protection area of an in-ship radar, and the Environmental Sensing Capability (ESC) monitors a radio wave use status of the in-ship radar in the DPA.

When utilization of radio waves by an in-ship radar (that is, the primary communication service) is detected in the DPA monitored by the ESC, the ESC notifies a Spectrum Access System (SAS) of the detection result. In addition, SAS instructs to stop radio wave transmission of a part (DPA Move List) of CBSDs (Citizens Broadband Radio Service Devices) located in the vicinity (Neighbor area) of the DPA among the managed CBSDs. At this time, the SAS can notify the CBSD of the vacant channel information and propose a channel change to the CBSD.

The ESC can be operated by a plurality of operators (ESC Operators). The SAS can also be operated by a plurality of operators (SAS Administrators). Therefore, there are assumable cases where different ESCs are cooperatively operated for each of SASs.

Figure 9:
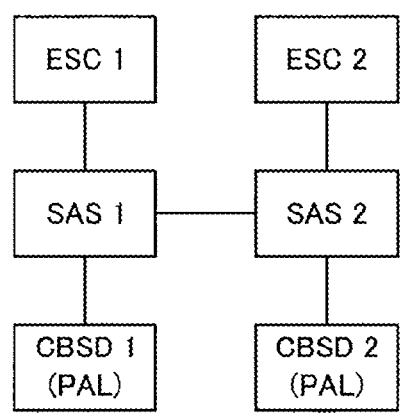
FIG. 9 is a diagram illustrating an example of a scenario in the presence of a plurality of SASs.

Here, the focus as an example of a possible scenario is a case where there is a plurality of SASs, and each of the SASs is individually operated in cooperation with the ESC. For example, FIG. 9 is a diagram illustrating an example of a scenario in the presence of a plurality of SASs. As illustrated in FIG. 9, an interface is provided between the SASs, by which management information is sequentially exchanged. Each of the SASs manages CBSD using a PAL channel. In addition, the example illustrated in FIG. 9 assumes that each of the ESCs monitors the same DPA and all CBSDs managed by each of the SASs exist in the neighbor area of the DPA monitored by the ESC. In addition, it is assumed that all the seven channels are currently used by exercising PALs. Note that, hereinafter, a channel that can be used by exercising the PAL is also referred to as a "PAL channel" for convenience.

On the premise as described above, it is assumed that the in-ship radar signal is detected by the ESC over three continuous channels among the seven PAL channels. In this case, upon receipt of the notification from the ESC, the SAS instructs the CBSDs using the three channels to stop radio waves. In addition, at this time, since the CBSDs that have been instructed to stop radio waves use PALs, the SAS can instruct the CBSDs to change to the other three unused channels (hereinafter, the process is also referred to as "evacuation").

Figure 10:
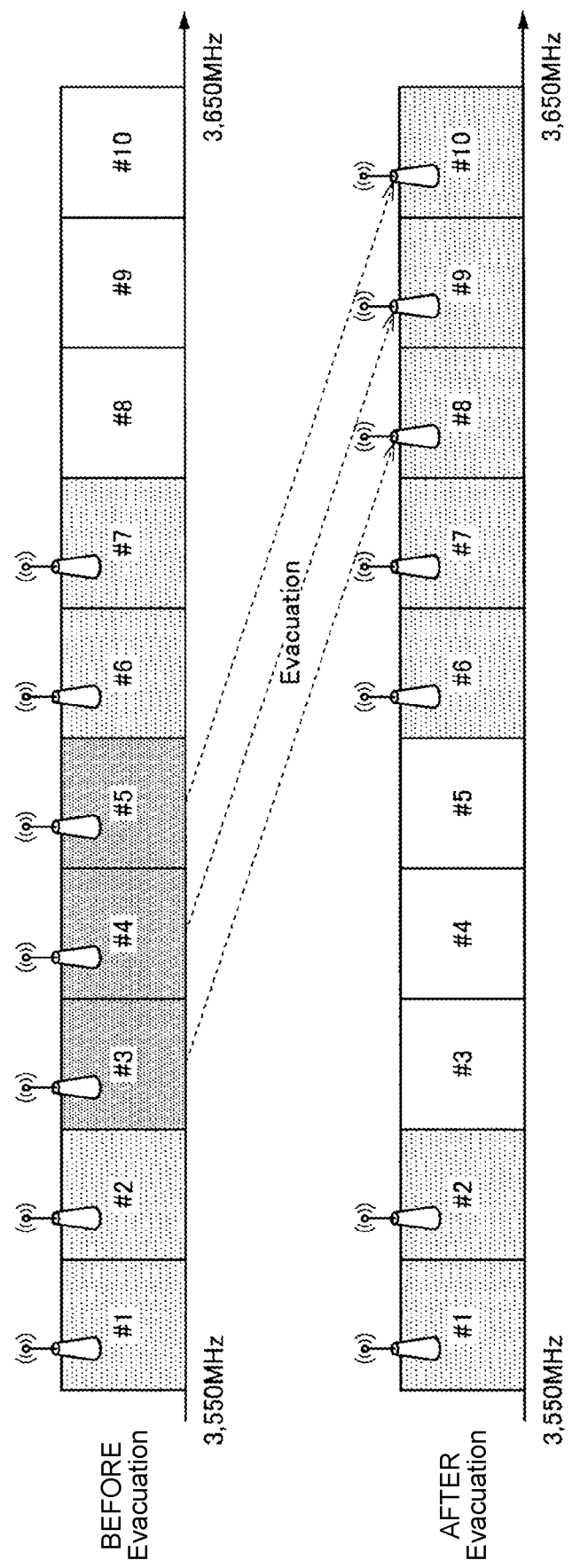
FIG. 10 is a diagram illustrating an outline of a procedure regarding evacuation of CBSD using PAL.

For example, FIG. 10 is a diagram illustrating an outline of a procedure related to evacuation of CBSD using PAL. The example illustrated in FIG. 10 is a case before evacuation in which in-ship radar signals have been detected for channels #3 to #5 in a situation where channels #1 to #7 are allocated to CBSDs using PALs. Therefore, in the example illustrated in FIG. 10, the SAS instructs CBSDs using the channels #3 to #5 to stop radio waves, and evacuates the CBSDs to unused channels #8 to #10.

On the other hand, there is a case where the plurality of ESCs has detected mutually different channels as being in use by the in-ship radar due to a detection error or the like of a sensor equipped in the ESC. For example, FIG. 11 is a diagram illustrating an outline of a procedure related to evacuation of CBSD using PAL, and schematically illustrates a situation in which erroneous detection by the ESC has occurred.

Figure 11:
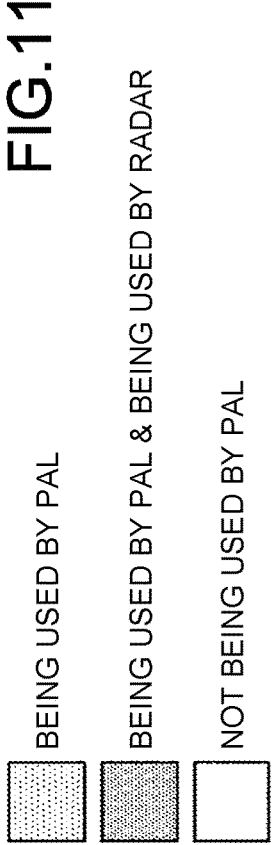
FIG. 11 is a diagram illustrating an outline of a procedure regarding evacuation of CBSD using PAL.
Figure 11:
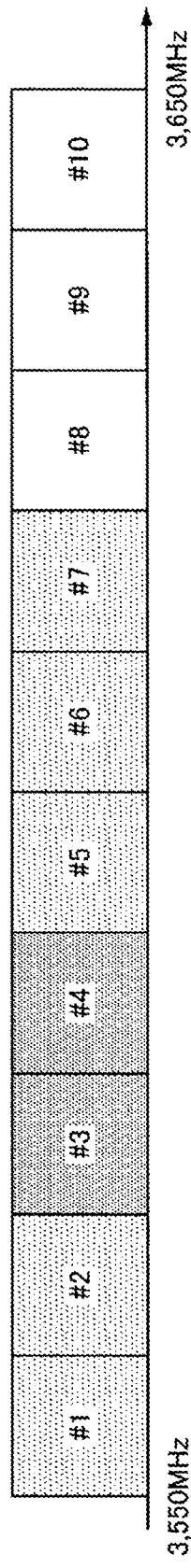
Figure 11:
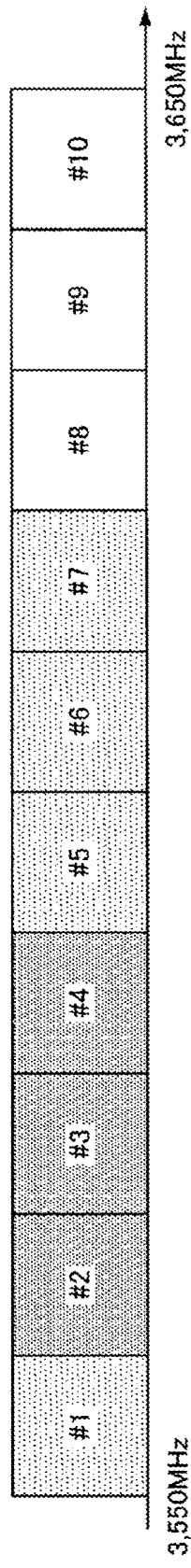
Figure 11:
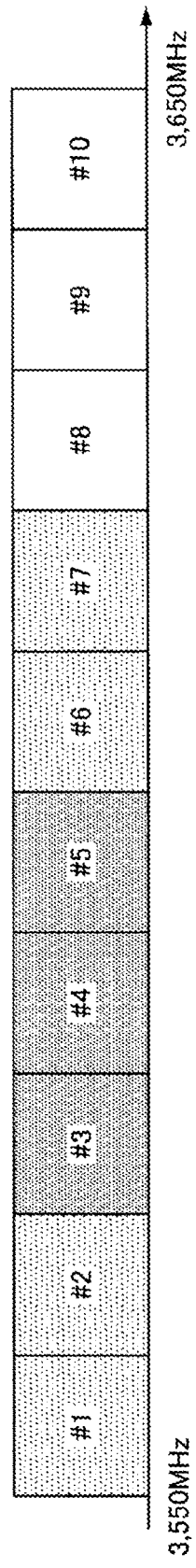

Specifically, the example illustrated in FIG. 11 is a case where channels #3 to #4 are being used by the in-ship radar under a situation where channels #1 to #7 are allocated to CBSDs using PALs. Under this situation, the ESC1 has detected the in-ship radar signals for channels #2 to #4. In contrast, the ESC2 has detected the in-ship radar signals for channels #3 to #5. That is, considering the logical sum of the detection results of the ESC1 and the ESC2, the in-ship radar signals apparently have been detected for channels #2 to #5.

In such a case, for example, for safety, a measure is sometimes taken to instruct to stop the radio waves for the CBSDs in all the detected channels. Such a measure would be allowable when the target is CBSD corresponding to General Authorized Access (GAA) that does not require a license. However, it is difficult to use the four channels in the case of the example illustrated in FIG. 11, leading to a difficulty in executing the evacuation process on all the CBSDs that use spectrums by exercising the PAL, in some cases. That is, in the example illustrated in FIG. 11, the number of channels available for allocation is six although the number of CBSDs using PALs is seven, resulting in shortage of one channel. That is, PALs for a total of four channels #2 to #5 before evacuation would compete for a total of three channels #8 to #10 in some cases. However, since the PAL is supposed to be acquired by network operators through spectrum auctions, it is more desirable to avoid such a situation and continuously exercise the PAL to enable spectrum utilization.

In addition, according to Literature 9 described below, it is required that PAL Channel Allocation should be common between SASs, so that it more desirable to avoid the above-described situation.

Literature 9: WINNF-TS-0245-V1.0.0 Operations for Citizens Broadband Radio Service (CBRS): Priority Access License (PAL) Database Technical Specification In view of the situation described above, the present disclosure proposes a technology that enables spectrum sharing in a more suitable manner even in a situation where an error occurs in a detection result of the frequency band used by the primary communication service. Specifically, the present disclosure proposes a technology that enables allocation of a frequency band available as secondary use to a CBSD (in particular, CBSD that uses PAL) as much as possible even when an error occurs in a detection result of radio wave use by a primary communication service.

4. Exemplary Embodiments of Present Disclosure

Subsequently, technical features of a system according to an embodiment of the present disclosure will be described below as an exemplary embodiment of the present disclosure. Specifically, as a representative exemplary embodiment of the system according to the present embodiment, an example when assuming application to CBRS in particular will be described.

4.1. Architecture and Sequence

First, in order to facilitate understanding of features of the technology according to the present disclosure, an example of an architecture and a system as a premise for description of the technical features of the system according to an embodiment of the present disclosure will be described. The architecture and the system described below are merely examples, and do not limit the application scope of the technology according to the present disclosure.

Figure 12:
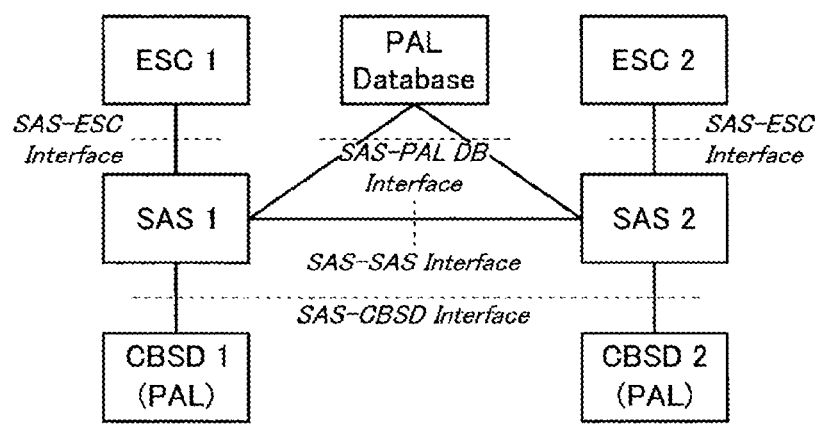
FIG. 12 is a diagram illustrating an example of an architecture of a system according to the embodiment.

First, an example of an architecture of a system according to an embodiment of the present disclosure will be described with reference to FIG. 12. FIG. 12 is a diagram illustrating an example of an architecture of the system according to the present embodiment. As illustrated in FIG. 12, the system according to an embodiment of the present disclosure includes a plurality of SASs (SAS1 and SAS2), ESCs (ESC1 and ESC2) provided respectively for these SASs, CBSDs (CBSD1 and CBSD2) managed by the SASs, and a PAL database. In the example illustrated in FIG. 12, the CBSD is assumed to be a CBSD using a PAL.

The PAL database corresponds to a database that is typically provided based on WINNF-TS-0245 and records auction results and a spectrum allocation status of the PAL. Basically, the PAL database is commonly used among a plurality of SASs. Furthermore, at the time of implementation in some regions or in some bands, the PAL database may be replaced with an entity having an equivalent function.

In the SAS-CBSD Interface, typically, various procedures between SAS and CBSD described above are executed. Furthermore, in addition to the procedure, signaling may be separately performed between SAS and CBSD.

In the SAS-SAS Interface, typically, various procedures between the plurality of SASs described above are executed. In addition to the procedure, signaling may be separately performed between the plurality of SASs.

The ESC corresponds to the radio wave sensing system described above. Typically, the ESC detects radar signals in the Federal incumbent system. In addition, the ESC may perform signal detection of other Incumbent systems in accordance with individual embodiments.

In the SAS-ESC interface, typically, information related to the Incumbent Protection, such as the detection result of the Incumbent signals, is exchanged. In the CBRS, when there is a standardized interface, the interface may be applied, or a proprietary interface protocol may be applied.

In the interface between the SAS-PAL database (SAS-PAL DB Interface), typically, the information recorded in the PAL database is provided to the SAS.

Figure 13:
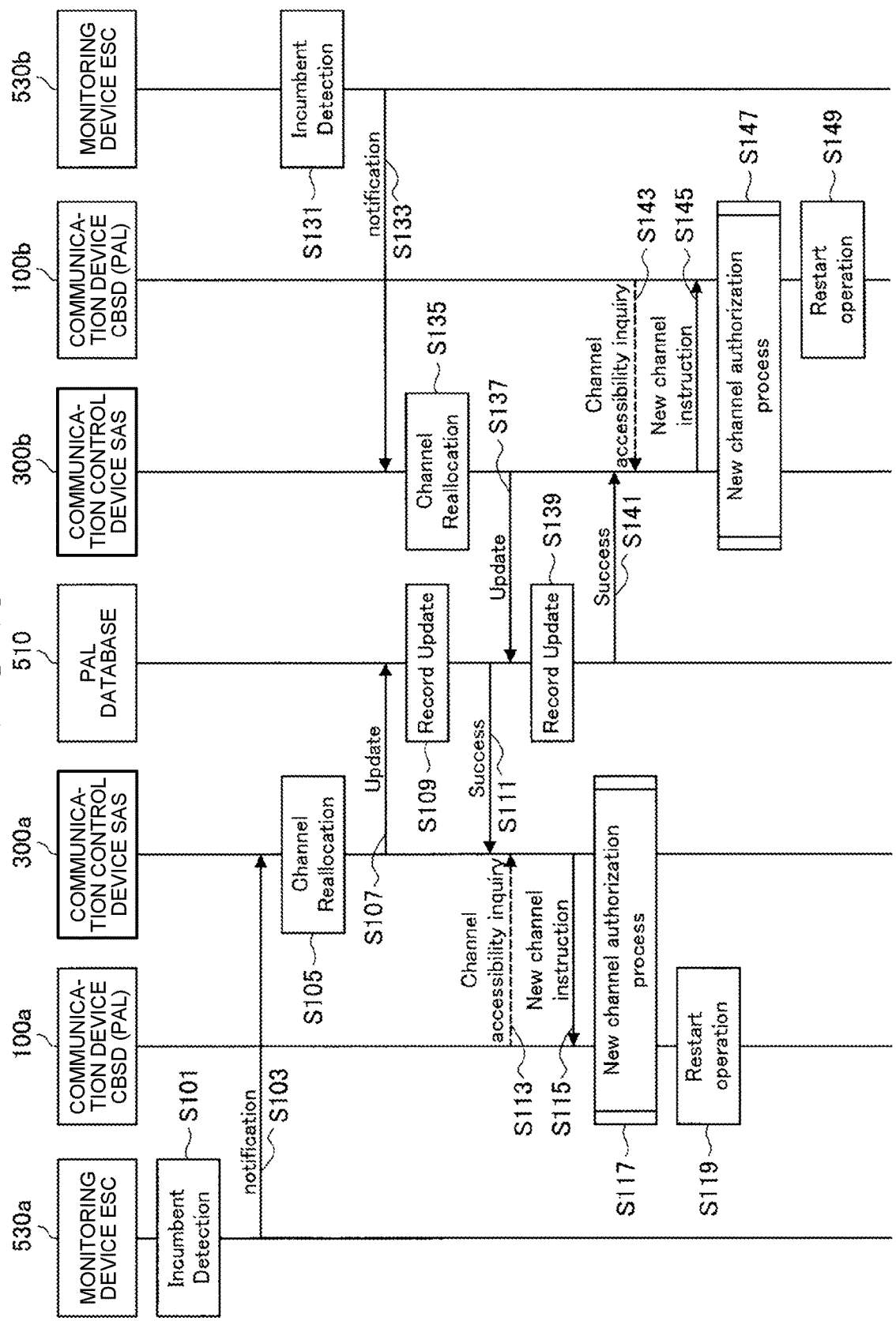
FIG. 13 is a sequence diagram illustrating an example of a flow of a series of processes of the system according to the embodiment.

Next, an example of a procedure sequence assumed in a system according to an embodiment of the present disclosure will be described with reference to FIG. 13. FIG. 13 is a sequence diagram illustrating an example of a flow of a series of processes of the system according to the present embodiment. In FIG. 13, monitoring devices 530a and 530b, communication devices 100a and 100b, communication control devices 300a and 300b, and a PAL database 510 respectively correspond to ESC1 and ESC2, CBSD1 and CBSD2, SAS1 and SAS2, and the PAL database in the example illustrated in FIG. 12.

As illustrated in FIG. 13, the monitoring device 530a (ESC) performs detection (Incumbent Detection) of frequency bands (channels) occupied by the primary communication service among frequency bands to be the target of spectrum sharing (S101), and then notifies the communication control device 300a of the detection result (S103).

The communication control device 300a reallocates channels (that is, channels available for secondary use) to the communication device 100a based on the notification from the monitoring device 530a (S105). In this case, the communication device 100 (CBSD) to be the target of reallocation is, for example, the communication device 100 (CBSD) estimated to have a possibility to apply strong interference to the primary communication service. Specifically, the CBSD included in Move List defined in Literature 1 described above can be a target of the reallocation. In the following description, in order to facilitate understanding of the features of the technology according to the present disclosure, it is assumed that the Move List includes the communication device 100 (CBSD) that uses the PAL channel. In addition, the communication control device 300a typically performs the reallocation of the PAL channels such that the rule related to the PAL allocation is observed.

The communication control device 300a notifies the PAL database 510 of the result of the channel reallocation described above, and requests the PAL database 510 to update the database in which the auction result of the PAL and the frequency allocation status are recorded (S107). In response to the request from the communication control device 300a, the PAL database 510 performs updates of the database (Record Update) based on the information notified from the communication control device 300a (S109), and then notifies the communication control device 300a of the update result (S111). In the following description, it is assumed that the database has been successfully updated.

Thereafter, upon receiving an inquiry (Channel accessibility inquiry) regarding a channel available as a secondary use from the communication device 100a (S113), the communication control device 300a notifies the communication device 100a of information regarding a newly allocated channel (S115). Note that a specific example of the procedure is the spectrum use notification/heartbeat described above. The information regarding the newly allocated channel notified to the communication device 100a corresponds to an example of "fourth information".

Next, a procedure regarding use of newly allocated channel referred to as a new channel authorization process is performed between the communication control device 300a and the communication device 100a (S117). Note that a specific example of the procedure is the spectrum grant procedure described above. When the procedure is completed, the communication device 100a resumes the radio wave transmission using the newly allocated channel (S119).

The above description has mainly focused on the procedures between the monitoring device 530a, the communication control device 300a, the PAL database 510, and the communication device 100a. On the other hand, a similar procedure can be applied between the monitoring device 530b, the communication control device 300b, the PAL database 510, and the communication device 100b. Specifically, the processes denoted by reference numerals S131 to S149 correspond to the processes denoted by reference numerals S101 to S119, respectively.

An example of the architecture and the system as the premise of the description of the technical features of the system according to an embodiment of the present disclosure has been described above with reference to FIGS. 12 and 13.

4.2. Sequence Details

Figure 14:
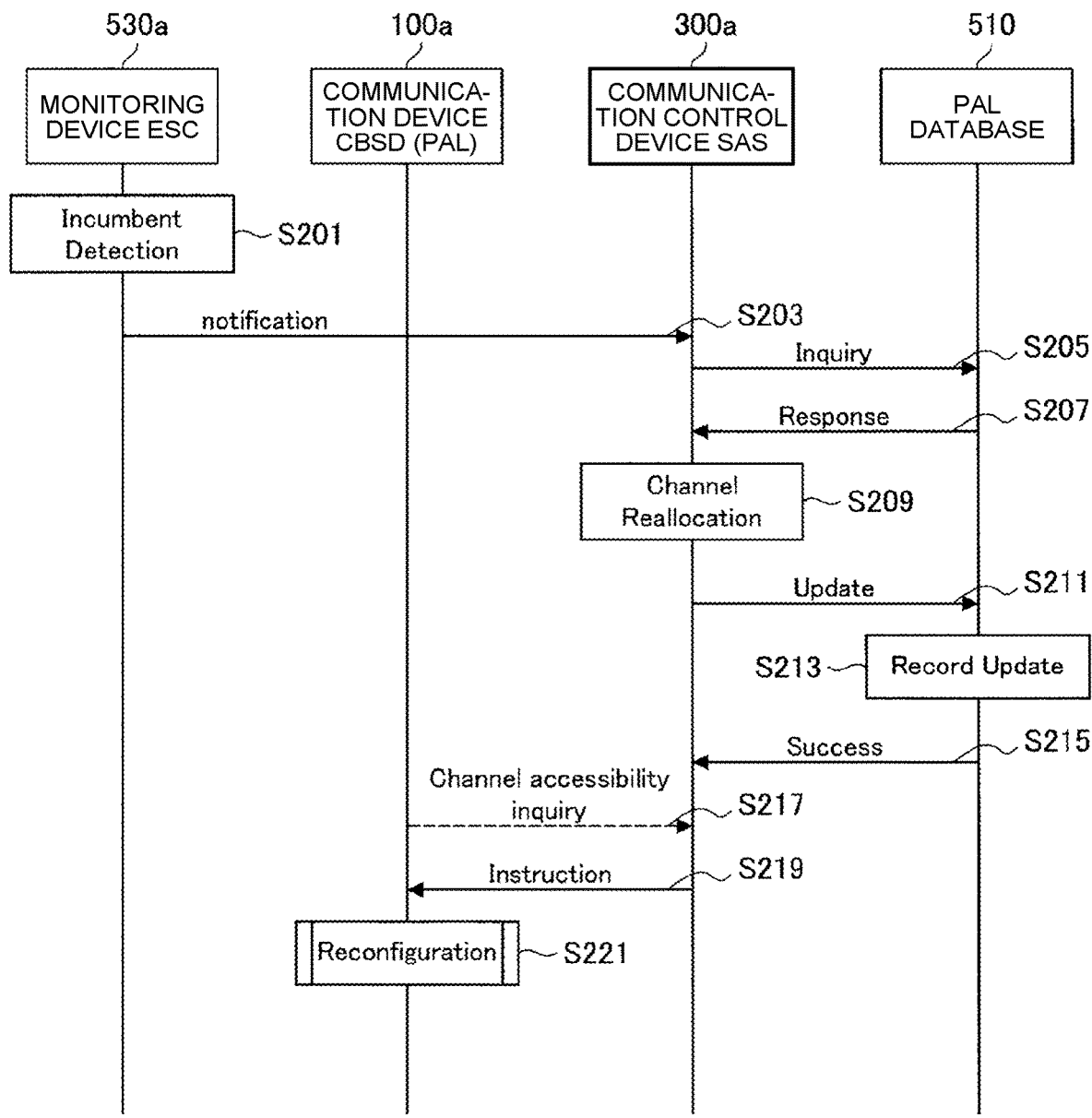
FIG. 14 is a sequence diagram illustrating an example of a flow of a series of processes of the system according to the embodiment.

Next, a technical feature of the system according to an embodiment of the present disclosure will be described focusing on a procedure between the monitoring device 530a, the communication control device 300a, the PAL database 510, and the communication device 100a illustrated in FIG. 13. For example, FIG. 14 is a sequence diagram illustrating an example of a flow of a series of processes of the system according to the present embodiment, illustrating an example of a procedure flow between the monitoring device 530a, the communication control device 300a, the PAL database 510, and the communication device 100a. Note that the processes denoted by reference numerals S201 and S203 are substantially similar to the processes denoted by reference numerals S101 and S103 in FIG. 13, and thus a detailed description thereof will be omitted.

In the system according to the present embodiment, after having received the notification from the monitoring device 530a (S203), the communication control device 300a inquires of the PAL database 510 about the current allocation status of the PAL channel (S205). At this time, the communication control device 300a may confirm whether information regarding channel assignment (Grant) to the communication device 100 (CBSD) to be an evaluation target is included in the Move List. At this time, in a case where the information regarding the communication device 100 to be the evaluation target is not included in the Move List, the communication control device 300a may cancel the subsequent processes. In addition, the information corresponding to the detection result of the frequency band occupied by the primary communication service, which is acquired by the communication control device 300 from the monitoring device 530 associated with itself, corresponds to an example of "second information".

Next, the communication control device 300a acquires information regarding the current allocation status of the PAL channel from the PAL database 510 as a response to the inquiry (S207), and reallocates the channels (that is, channels available as secondary use) to the communication device 100a based on the information (S209).

Note that the information regarding the current allocation status of the PAL channel, which is acquired from the PAL database at this time, can include information regarding a detection result (for example, a detection result obtained by the monitoring device 530b) for the frequency band occupied by the primary communication service, which is acquired on the side of the other communication control device 300 (for example, the communication control device 300b illustrated in FIG. 13). With this operation, the communication control device 300a can reallocate the channel to the communication device 100a in consideration of the detection result obtained by the other monitoring device 530 associated with the other communication control device 300 in addition to the detection result obtained by the monitoring device 530a associated with itself. The information regarding the current PAL channel allocation status (in other words, information corresponding to the detection result obtained by the other monitoring device 530) acquired from the PAL database corresponds to an example of "third information". In addition, information regarding a frequency band (channel) occupied by the primary communication service in a case where the third information and the above-described second information are not particularly limited corresponds to an example of "first information". That is, the first information can include at least one of the second information or the third information. Furthermore, among the detection results of the frequency band occupied by the primary communication service by the plurality of monitoring devices 530 different from each other, a part of the results corresponds to an example of a "first detection result", while the other part corresponds to an example of a "second detection result". As a specific example, in a case where the detection result obtained by the monitoring device 530a illustrated in FIGS. 13 and 14 is defined as the "first detection result", the detection result obtained by the monitoring device 530b illustrated in FIG. 13 can correspond to the "second detection result".

Figure 15:
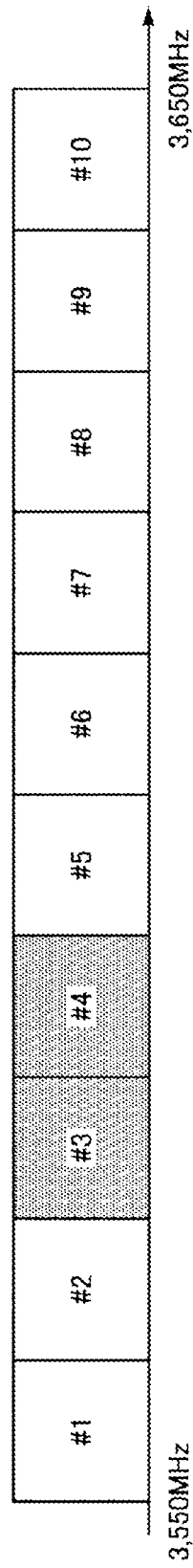
FIG. 15 is a diagram illustrating an example of processes related to channel reallocation by the system according to the embodiment.
Figure 15:
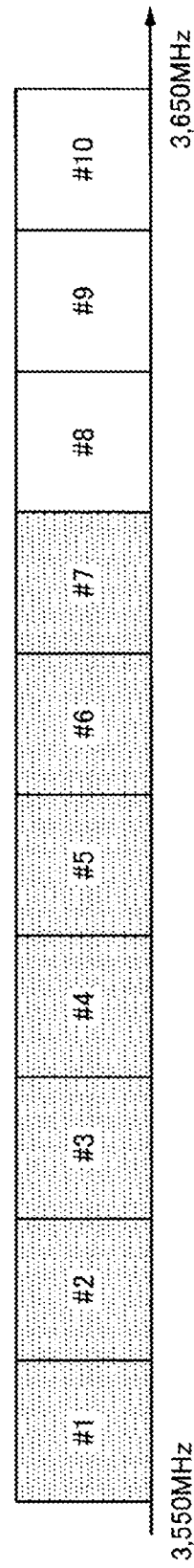
Figure 15:
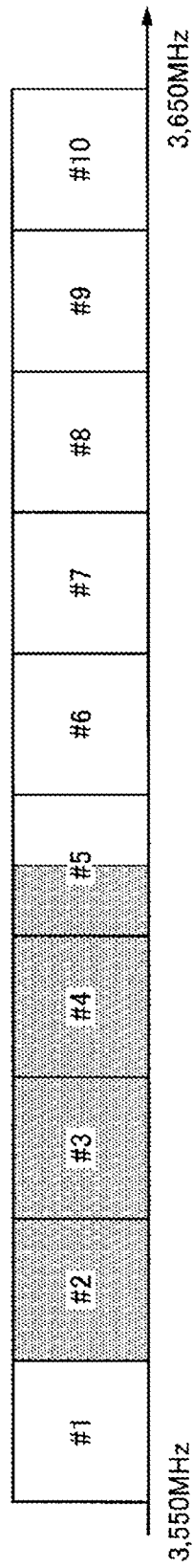

Here, with reference to FIGS. 15 and 16, an example of processes related to reallocation of channels available for secondary use will be described with a specific example. FIGS. 15 and 16 are diagrams illustrating an example of processes related to channel reallocation by the system according to the present embodiment.

First, a state before channel reallocation is performed will be described with reference to FIG. 15. In FIG. 15, the upper diagram illustrates channels corresponding to spectrums actually being used by an in-ship radar which is the primary communication service. That is, in the example illustrated in FIG. 15, the in-ship radar occupies two channels, namely, channels #3 to #4 among channels #1 to #10.

The middle diagram illustrates an allocation status of the channel to each of the communication devices 100 (CBSD) using the PAL in a state before execution of channel reallocation. That is, in the example illustrated in FIG. 15, seven channels, namely, channels #1 to #7 among the channels #1 to #10, are allocated to the communication devices 100. Note that the channels #8 to #10 are assumed to be vacant channels.

The lower diagram illustrates a recognition result of the channels being used by the in-ship radar according to the detection result obtained by the monitoring device 530. Specifically, the lower diagram can correspond to, for example, the recognition result of the channel used for the in-ship radar corresponding to the detection result obtained by the monitoring device 530a and the current PAL channel allocation status (in other words, a detection result obtained by the other monitoring device 530) notified by the PAL database 510. That is, in the example illustrated in FIG. 15, an error occurs in the detection results obtained by a part of the monitoring devices 530, and it is recognized that 3.5 channels, namely, channels #2 to #4 and a part (½) of the channel #5, out of channels #1 to #10, are occupied by the in-ship radar.

Under this circumstance, in the example illustrated in FIG. 15, the communication devices 100 to which the channels #2 to #5 are allocated need to be evacuated to other vacant channels. However, since there are three vacant channels being available over the entire channel, it is difficult to evacuate a part of the communication devices 100. In view of such a situation, the communication control device 300 according to an embodiment of the present disclosure handles a channel detected as being occupied by the primary communication service (for example, in-ship radar) only for a part of a frequency band, by using another frequency band, that is, a frequency band other than the part of the frequency band, as a reallocation target, thereby ensuring continuity of a service (in particular, the secondary communication service provided by the communication device 100) as much as possible.

Specifically, the communication control device 300a (SAS) checks the degree of overlap of the occupied frequency bands for each of the channels corresponding to the frequency bands recognized to be occupied by the in-ship radar. In the example illustrated in FIG. 15, each of the channels #2 to #4 is occupied over the entire channel (Full overlap), while the channel #5 is occupied only in a part of the channel (Partial overlap).

At this time, the communication control device 300a may limit the channels to be the confirmation targets of the degree of overlap in the occupied frequency bands. For example, when it is predetermined that a series of frequency bands are occupied by the primary communication service, the communication control device 300a may confirm the degree of overlap of the occupied frequency bands by focusing on the channels at both ends among the frequency bands recognized to be occupied by the primary communication service.

Subsequently, the communication control device 300a handles a channel in which only a part of the frequency band is occupied by specifying another frequency band, that is, a frequency band other than the part of the frequency band, thereby using the other frequency band as an evacuation area of the communication device 100 (CBSD). That is, in the case of the example illustrated in FIG. 15, the frequency band corresponding to channel #5 is divided into one frequency band occupied by the in-ship radar (primary communication service) and the other frequency band that is not occupied, and the other frequency band which is not occupied will be used as an evacuation area of the communication device 100.

As a specific example, the communication control device 300a may determine a channel not included in either a detection result obtained by the monitoring device 530a or a detection result obtained by another monitoring device 530 (for example, the monitoring device 530b) different from the monitoring device 530a, as a target of reallocation for one or more communication devices 100 (CBSD). In addition to this, the communication control device 300a may determine the frequency band specified for a channel in which only a part of the frequency band is occupied, which is a frequency band other than the part of the frequency band, as a target of reallocation for one or more communication devices 100 (CBSD). Furthermore, in a case where there is a plurality of channels in which only a part of the frequency band is occupied, each of other frequency bands, that is, frequency bands other than the part of the frequency bands specified for each of channels may be determined as a target of reallocation for one or more communication devices 100 (CBSD).

With the above control, even though the available frequency band is limited for the communication device 100 evacuated to the divided frequency band, it is still possible to ensure the continuity of the service (secondary communication service).

For example, FIG. 16 schematically illustrates a state after channel reallocation is performed. That is, in the example illustrated in FIG. 16, another frequency band different from the frequency band recognized as being used for the in-ship radar illustrated in the lower diagram, that is, channels #1,

6 to #10, and a part of channel #5, are allocated to the communication devices 100 (CBSDs).

Note that, when performing channel reallocation, the communication control device 300a may determine the communication device 100 to be evacuated to a channel in which only a part of the frequency band is available, in accordance with the capability of each of the communication devices 100. Specifically, the communication control device 300a may specify the communication device 100 that can use a carrier having an allowable size in the bandwidth of the frequency band not occupied by the primary communication service among the target channels, as a target of the frequency band evacuation.

As a more specific example, when there is a recognition that 3 MHz is occupied by the primary communication service among a channel of 10 MHz bandwidth, the communication device 100 that can use a carrier usable for transmission using the remaining 7 MHz may be specified as a target of evacuation. That is, in this case, the communication device 100 that can use a carrier that is 7 MHz or less (for example, a 5 MHz carrier) can be specified as the target of evacuation. As a more specific example, in a case where the communication device 100 that can use a 5 MHz carrier is specified as an evacuation target under a situation where a 7 MHz carrier is available, the spectrum of 5 MHz in the frequency band of the 7 MHz width will be allocated to the communication device 100.

Note that, as long as the communication control device 300 can recognize the capability of each of the communication devices 100 at the timing of reallocating the frequency band, there would be no limitation in the method of acquiring the information regarding the capability and the acquisition trigger. As a specific example, it is possible to acquire capability information of the target communication device 100 at the time of the registration procedure described above. Furthermore, as another example, the capability information of the communication device 100 may be acquired by predetermined signaling.

In addition, by applying the above-described control, the communication device 100 (CBSD) does not need to change the cell ID of the carrier after spectrum shrinkage. This enables the communication device 100 to perform control such that the carrier after spectrum shrinkage is to be used within a range of the control regarding resource scheduling without performing handover on the terminal device 200 (UE) which has been served by using the frequency band allocated when the radio waves are stopped.

Furthermore, as a matter of course, a procedure for returning the communication device 100 controlled such that only a part of the frequency band is used to a state where the frequency band for one whole channel is available may be performed after a lapse of the radio wave stop period (that is, a period in which a part of the frequency band (channel) is occupied by the primary communication service).

In addition, as a result of the inquiry of the PAL database, there is an assumable situation in which at least a part of the assumed vacant channels (for example, channels #8 to #10 in FIG. 15) has been already occupied. As a specific example, in a case where the channel has been reallocated to the communication device 100 (CBSD) managed by the communication control device 300 (SAS) by another communication control device 300 before the inquiry to the PAL database is performed, there might be a situation in which at least a part of the assumed vacant channels is already occupied. Even in such a case, confirmation of the degree of overlap of the occupied frequency bands described above, channel division, and allocation of frequency bands after the division may be performed. With application of such control, service continuity can be ensured for as many communication devices 100 as possible.

Here, the remaining processes in the example illustrated in FIG. 14 will be described in more details. In FIG. 14, the processes indicated by reference numerals S211 to S221 are substantially similar to the processes indicated by reference numerals S107 to S119 in the example illustrated in FIG. 13. That is, the database managed by the PAL database 510 is updated according to the result of the reallocation (S211 to S215), and a series of procedures for starting the radio communication using the frequency band after the reallocation is executed between the communication control device 300a and the communication device 100a (S221).

Hereinabove, with reference to FIGS. 14 to 16, the technical features of the system according to an embodiment of the present disclosure have been described focusing on a procedure between the monitoring device 530a, the communication control device 300a, the PAL database 510, and the communication device 100a illustrated in FIG. 13.

5. Application Examples

The technology according to the present disclosure is applicable to various products. For example, an application server 60, the network manager 400, and the PAL database 510 may be implemented as any type of server such as a tower server, a rack server, or a blade server. Furthermore, at least a part of the components of the application server 60, the network manager 400, and the PAL database 510 may be implemented in a module (for example, an integrated circuit module formed with one die, or a card or blade inserted into a slot of a blade server) mounted on the server.

Furthermore, the communication device 100 may be implemented as any type of evolved Node B (eNB) such as a macro eNB or a small eNB, for example. The small eNB may be an eNB that covers a cell smaller than a macro cell, such as a pico eNB, a micro eNB, or a home (femto) eNB. Instead, the communication device 100 may be implemented as other types of base station such as a Node B or a Base Transceiver Station (BTS). The communication device 100 may include a main body (also referred to as a base station device) that controls radio communication, and one or more Remote Radio Heads (RRHs) disposed at a location different from the main body. Furthermore, various types of terminals described below may operate as the communication device 100 by temporarily or semi-permanently executing the base station function.

Furthermore, for example, the terminal device 200 may be implemented as a mobile terminal such as a smartphone, a tablet Personal Computer (PC), a notebook PC, a portable game terminal, a portable/dongle type mobile router, and a digital camera, or as an in-vehicle terminal such as a car navigator. The terminal device 200 may also be implemented as a terminal (also referred to as a Machine Type Communication (MTC) terminal) that performs Machine To Machine (M2M) communication, in a surveillance camera, a gateway terminal of various sensor devices, a vehicle that actualizes a means of transportation, such as a car, a bus, a train, or an aircraft. Furthermore, at least a part of components of the terminal device 200 may be implemented in a module (for example, an integrated circuit module formed with one die) mounted on these terminals.

5.1. Application Examples Related to Server

Figure 17:
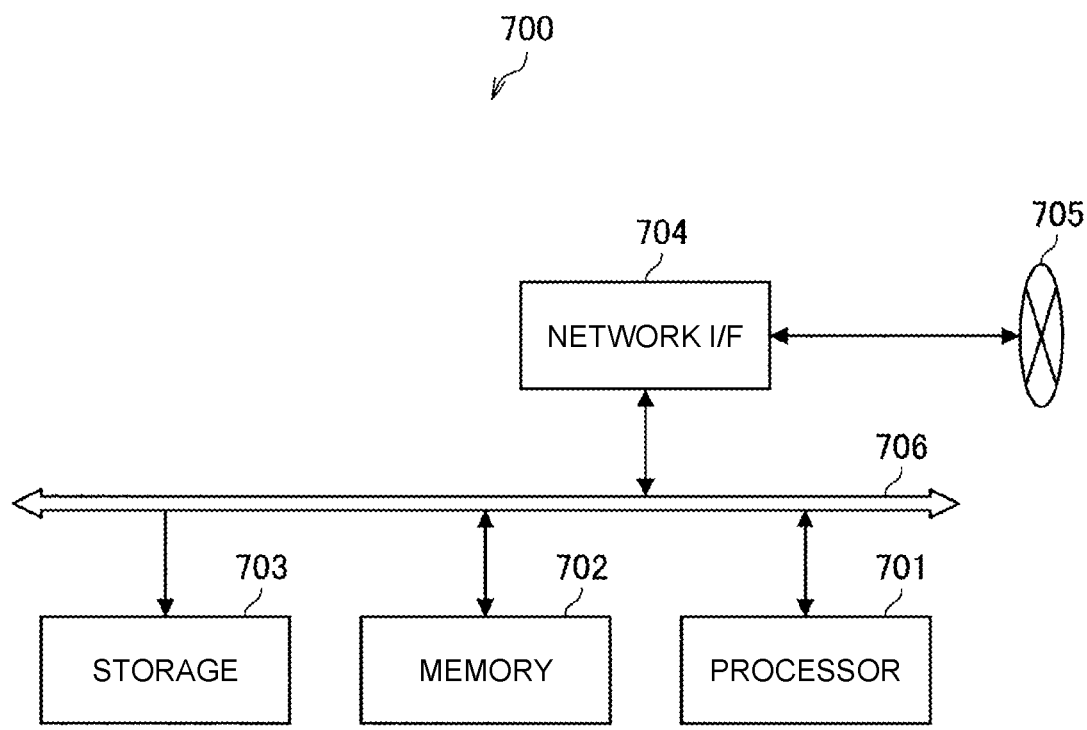
FIG. 17 is a block diagram illustrating an example of a schematic configuration of a server.

FIG. 17 is a block diagram illustrating an example of a schematic configuration of a server 700 to which the techniques according to the present disclosure are applicable. The server 700 includes a processor 701, memory 702, storage 703, a network interface 704, and a bus 706.

The processor 701 may be, for example, a central processing unit (CPU) or a digital signal processor (DSP), and controls various functions of the server 700. The memory 702 includes random access memory (RAM) and read only memory (ROM), and stores programs to be executed by the processor 701 as well as data. The storage 703 can include a storage medium such as semiconductor memory or a hard disk.

The network interface 704 is a wired communication interface for connecting the server 700 to a wired communication network 705. The wired communication network 705 may be a core network such as an Evolved Packet Core (EPC), or may be a Packet Data Network (PDN) such as the Internet.

The bus 706 connects the processor 701, the memory 702, the storage 703, and the network interface 704 to each other. The bus 706 may include two or more buses (for example, a high-speed bus and a low-speed bus) having different bus speeds.

In the server 700 illustrated in FIG. 17, one or more components included in the control unit 330 described with reference to FIG. 6 (at least one of the communication control unit 331, the information acquisition unit 333, the specifying unit 335, or the notification unit 337) may be implemented in the processor 701. As an example, a program for causing the processor to function as the one or more components (in other words, a program for causing the processor to perform the operation of the one or more components) may be installed on the server 700 and the processor 701 may execute the program. As another example, the server 700 may be equipped with a module including the processor 701 and the memory 702, and the one or more components may be mounted on the module. In this case, the module may store a program for causing the processor to function as the one or more components in the memory 702, and the program may be executed by the processor 701. As described above, the server 700 or the above-described module may be provided as a device including the one or more components, and a program for causing the processor to function as the one or more components may be provided. Furthermore, a readable recording medium on which the above program is recorded may be provided.

5.2. Application Examples Related to Base Station

First Application Example

Figure 18:
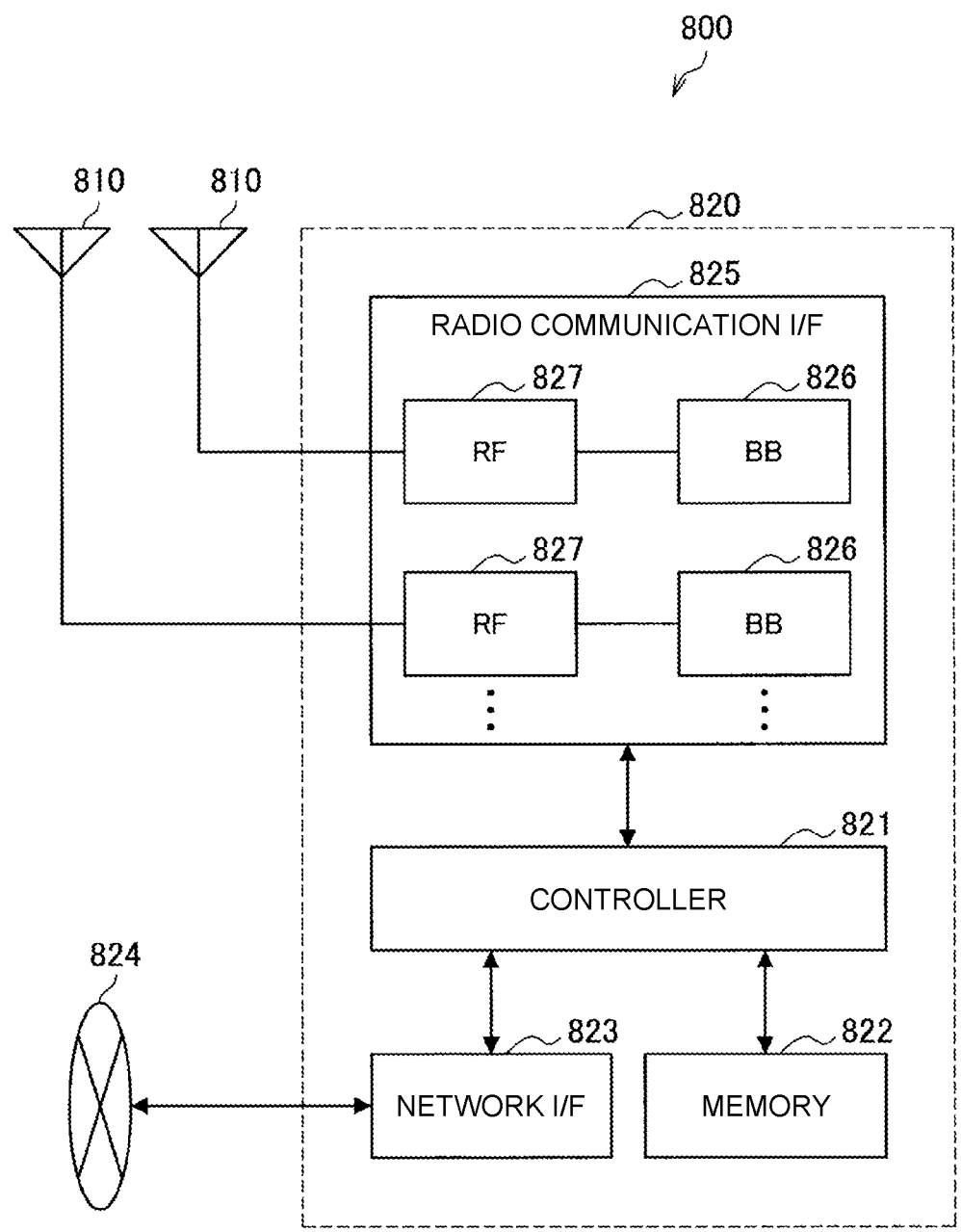
FIG. 18 is a block diagram illustrating a first example of a schematic configuration of an eNB.

FIG. 18 is a block diagram illustrating a first example of a schematic configuration of an eNB to which the techniques according to the present disclosure are applicable. An eNB 800 has one or more antennas 810 and a base station device 820. Each of the antennas 810 and the base station device 820 can be connected to each other via an RF cable.

Each of the antennas 810 has a single or a plurality of antenna elements (for example, a plurality of antenna elements constituting a MIMO antenna) and is used for transmission and reception of radio signals by the base station device 820. The eNB 800 has a plurality of antennas 810 as illustrated in FIG. 18, and the plurality of antennas 810 may correspond to a plurality of frequency bands used by the eNB 800, respectively, for example. Although FIG. 18 illustrates an example in which the eNB 800 has the plurality of antennas 810, the eNB 800 may have a single antenna 810.

The base station device 820 includes a controller 821, memory 822, a network interface 823, and a radio communication interface 825.

The controller 821 may be a CPU or DSP, for example, and controls operation of various functions of an upper layer of the base station device 820. For example, the controller 821 generates a data packet from the data in the signal processed by the radio communication interface 825 and transfers the generated packet via the network interface 823. The controller 821 may generate a bundled packet by bundling data from a plurality of baseband processors and transfer the generated bundled packet. In addition, the controller 821 may include logical functions that execute controls such as radio resource control, radio bearer control, mobility management, admission control, or scheduling. Furthermore, the control may be executed in cooperation with surrounding eNBs or a core network node. The memory 822 includes RAM and ROM, and stores a program executed by the controller 821 and various types of control data (for example, terminal list, transmission power data, and scheduling data)

The network interface 823 is a communication interface for connecting the base station device 820 to a core network 824. The controller 821 may communicate with a core network node or other eNBs via the network interface 823. In that case, the eNB 800 may be connected to the core network node or other eNB to each other by a logical interface (for example, an S1 interface or an X2 interface). The network interface 823 may be a wired communication interface or a radio communication interface for a wireless backhaul. When the network interface 823 is a radio communication interface, the network interface 823 may use a frequency band higher than the frequency band used by the radio communication interface 825, for radio communication.

The radio communication interface 825 supports a cellular communication scheme such as Long Term Evolution (LTE) or LTE-Advanced, and provides a radio connection to terminals located in the cell of the eNB 800 via the antenna 810. The radio communication interface 825 can typically include a baseband (BB) processor 826, RF circuit 827, or the like. The BB processor 826 may perform encoding/decoding, modulation/demodulation, and multiplexing/demultiplexing, for example, and executes various types of signal processing in individual layers (for example, L1, Medium Access Control (MAC), Radio Link Control (RLC), and Packet Data Convergence Protocol (PDCP)). The BB processor 826 may include some or all of the above-described logical functions instead of the controller 821. The BB processor 826 may be a module including: memory for storing a communication control program; a processor for executing the program; and related circuits. The functions of the BB processor 826 may be modified by updating the above program. Furthermore, the module may be a card or a blade inserted into a slot of the base station device 820, or may be a chip mounted on the card or the blade. The RF circuit 827 may include a mixer, a filter, an amplifier, or the like, and transmits and receives radio signals via the antenna 810.

The radio communication interface 825 may include a plurality of BB processors 826 as illustrated in FIG. 18, and the plurality of BB processors 826 may correspond to a plurality of frequency bands used by the eNB 800, respectively, for example. Furthermore, the radio communication interface 825 may include a plurality of RF circuits 827 as illustrated in FIG. 18, and the plurality of RF circuits 827 may correspond to a plurality of antenna elements, respectively, for example. Although FIG. 18 illustrates an example in which the radio communication interface 825 includes a plurality of BB processors 826 and a plurality of RF circuits 827, the radio communication interface 825 may include a single BB processor 826 or a single RF circuit 827.

The one or more components included in the control unit 150 described with reference to FIG. 4 illustrated in FIG. 18 (at least one of the communication control unit 151, the information acquisition unit 153, or the notification unit 155) may be implemented in the radio communication interface 825. Alternatively, at least a part of these components may be implemented in the controller 821. As an example, the eNB 800 is equipped with a module including a part or all of the radio communication interface 825 (for example, the BB processor 826) and/or the controller 821, and the module may be equipped with one or more of the above components. In this case, the module may store a program for causing the processor to function as the one or more components (in other words, a program for causing the processor to perform the operation of the one or more components) and may execute the program. As another example, the program causing the processor to function as the one or more of the above components may be installed in the eNB 800, and the radio communication interface 825 (for example, the BB processor 826) and/or the controller 821 may execute the program. As described above, the eNB 800, the base station device 820, or the above module may be provided as a device including the one or more components, and a program for causing the processor to function as the one or more components may be provided. Furthermore, a readable recording medium on which the above program is recorded may be provided.

Furthermore, in the eNB 800 illustrated in FIG. 18, the radio communication unit 120 described with reference to FIG. 4 may be implemented in the radio communication interface 825 (for example, the RF circuit 827). Furthermore, the antenna unit 110 may be implemented in the antenna 810. Furthermore, the network communication unit 130 may be implemented in the controller 821 and/or the network interface 823. Furthermore, the storage unit 140 may be implemented in the memory 822.

Second Application Example

Figure 19:
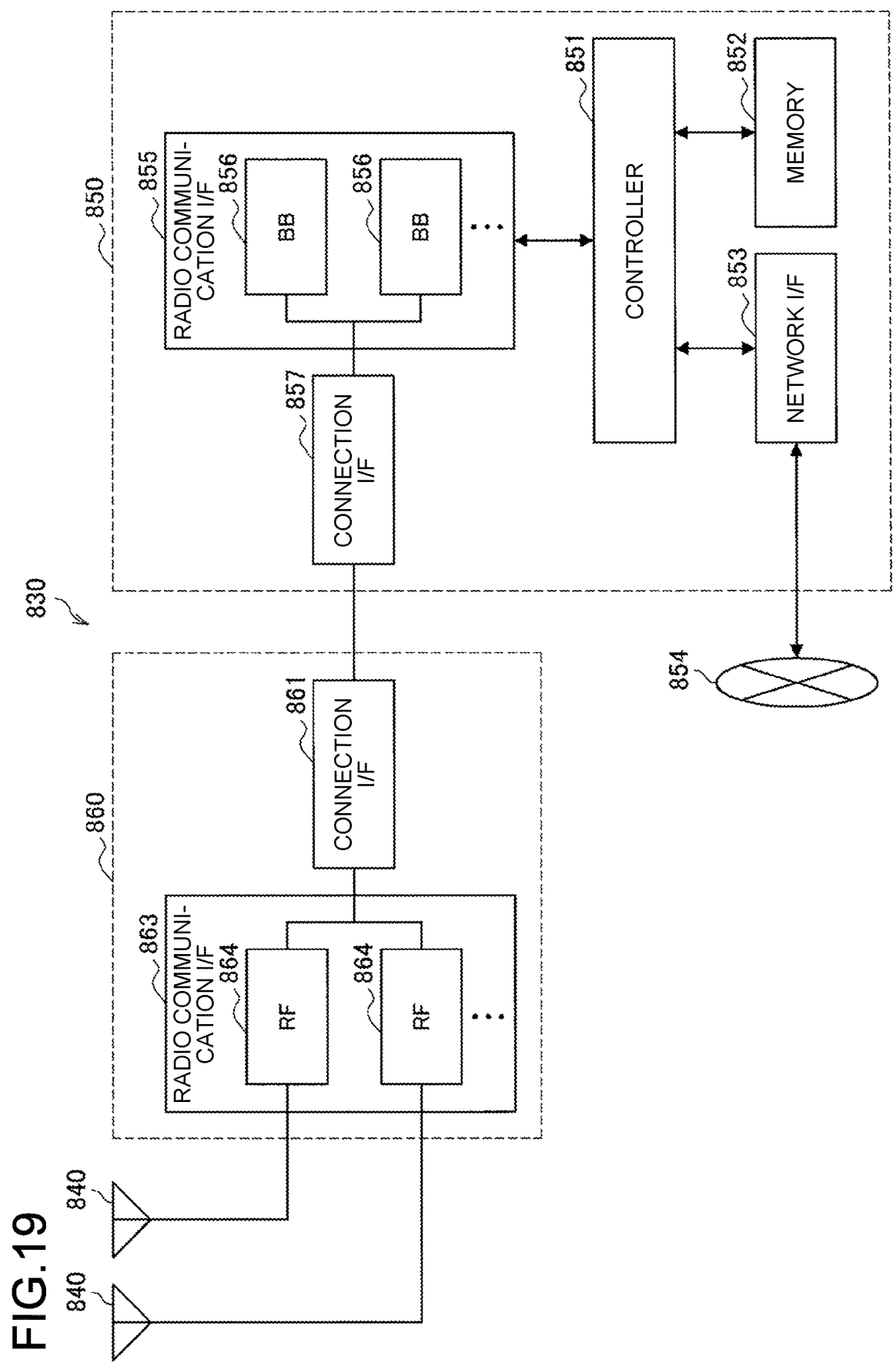
FIG. 19 is a block diagram illustrating a second example of a schematic configuration of an eNB.

FIG. 19 is a block diagram illustrating a second example of a schematic configuration of an eNB to which the techniques according to the present disclosure are applicable. An eNB 830 has one or more antennas 840, a base station device 850, and an RRH 860. Each of the antennas 840 and the RRH 860 can be connected to each other via an RF cable. Furthermore, the base station device 850 and the RRH 860 can be connected to each other by a high-speed line such as an optical fiber cable.

Each of the antennas 840 has a single or a plurality of antenna elements (for example, a plurality of antenna elements constituting a MIMO antenna) and is used for transmission and reception of radio signals by the RRH 860. The eNB 830 has a plurality of antennas 840 as illustrated in FIG. 19, and the plurality of antennas 840 may correspond to a plurality of frequency bands used by the eNB 830, respectively, for example. Although FIG. 19 illustrates an example in which the eNB 830 has the plurality of antennas 840, the eNB 830 may have a single antenna 840.

The base station device 850 includes a controller 851, memory 852, a network interface 853, a radio communication interface 855, and a connection interface 857. The controller 851, the memory 852, and the network interface 853 are similar to the controller 821, the memory 822, and the network interface 823 described with reference to FIG. 18, respectively.

The radio communication interface 855 supports a cellular communication scheme such as LTE or LTE-Advanced, and provides a radio connection to terminals located in the sector corresponding to the RRH 860 via the RRH 860 and the antenna 840. The radio communication interface 855 can typically include a BB processor 856 or the like. The BB processor 856 is similar to the BB processor 826 described with reference to FIG. 18, except that connection to an RF circuit 864 of the RRH 860 is made via the connection interface 857. The radio communication interface 855 may include a plurality of BB processors 856 as illustrated in FIG. 19, and the plurality of BB processors 856 may correspond to a plurality of frequency bands used by the eNB 830, respectively, for example. Although FIG. 19 illustrates an example in which the radio communication interface 855 includes a plurality of BB processors 856, the radio communication interface 855 may include a single BB processor 856.

The connection interface 857 is an interface for connecting the base station device 850 (radio communication interface 855) to the RRH 860. The connection interface 857 may be a communication module for communication over the high-speed line connecting the base station device 850 (radio communication interface 855) and the RRH 860.

The RRH 860 also includes a connection interface 861 and a radio communication interface 863.

The connection interface 861 is an interface for connecting the RRH 860 (radio communication interface 863) to the base station device 850. The connection interface 861 may be a communication module for communication over the high-speed line.

The radio communication interface 863 transmits and receives radio signals via the antenna 840. The radio communication interface 863 can typically include the RF circuit 864 or the like. The RF circuit 864 may include a mixer, a filter, an amplifier, or the like, and transmits and receives radio signals via the antenna 840. The radio communication interface 863 includes a plurality of RF circuits 864 as illustrated in FIG. 19, and the plurality of RF circuits 864 may correspond to a plurality of antenna elements, respectively, for example. Although FIG. 19 illustrates an example in which the radio communication interface 863 includes a plurality of RF circuits 864, the radio communication interface 863 may include a single RF circuit 864.

In the eNB 830 illustrated in FIG. 19, one or more components included in the control unit 150 described with reference to FIG. 4 (at least one of the communication control unit 151, the information acquisition unit 153, or the notification unit 155) may be implemented in the radio communication interface 855 and/or the radio communication interface 863. Alternatively, at least a part of these components may be implemented in the controller 851. As an example, the eNB 830 may be equipped with a module including part or all of the radio communication interface 855 (for example, the BB processor 856) and/or the controller 851, and the module may be equipped with one or more of the above components. In this case, the module may store a program for causing the processor to function as the one or more components (in other words, a program for causing the processor to perform the operation of the one or more components) and may execute the program. As another example, the program causing the processor to function as the one or more of the above components may be installed on the eNB 830, and the radio communication interface 855 (for example, the BB processor 856) and/or the controller 851 may execute the program. As described above, the eNB 830, the base station device 850, or the above module may be provided as a device including the one or more components, and a program for causing the processor to function as the one or more components may be provided. Furthermore, a readable recording medium on which the above program is recorded may be provided.

Furthermore, in the eNB 830 illustrated in FIG. 19, the radio communication unit 120 described with reference to FIG. 4, for example, may be implemented in the radio communication interface 863 (for example, the RF circuit 864). Furthermore, the antenna unit 110 may be implemented in the antenna 840. Furthermore, the network communication unit 130 may be implemented in the controller 851 and/or the network interface 853. Furthermore, the storage unit 140 may be implemented in the memory 852.

Figure 20:
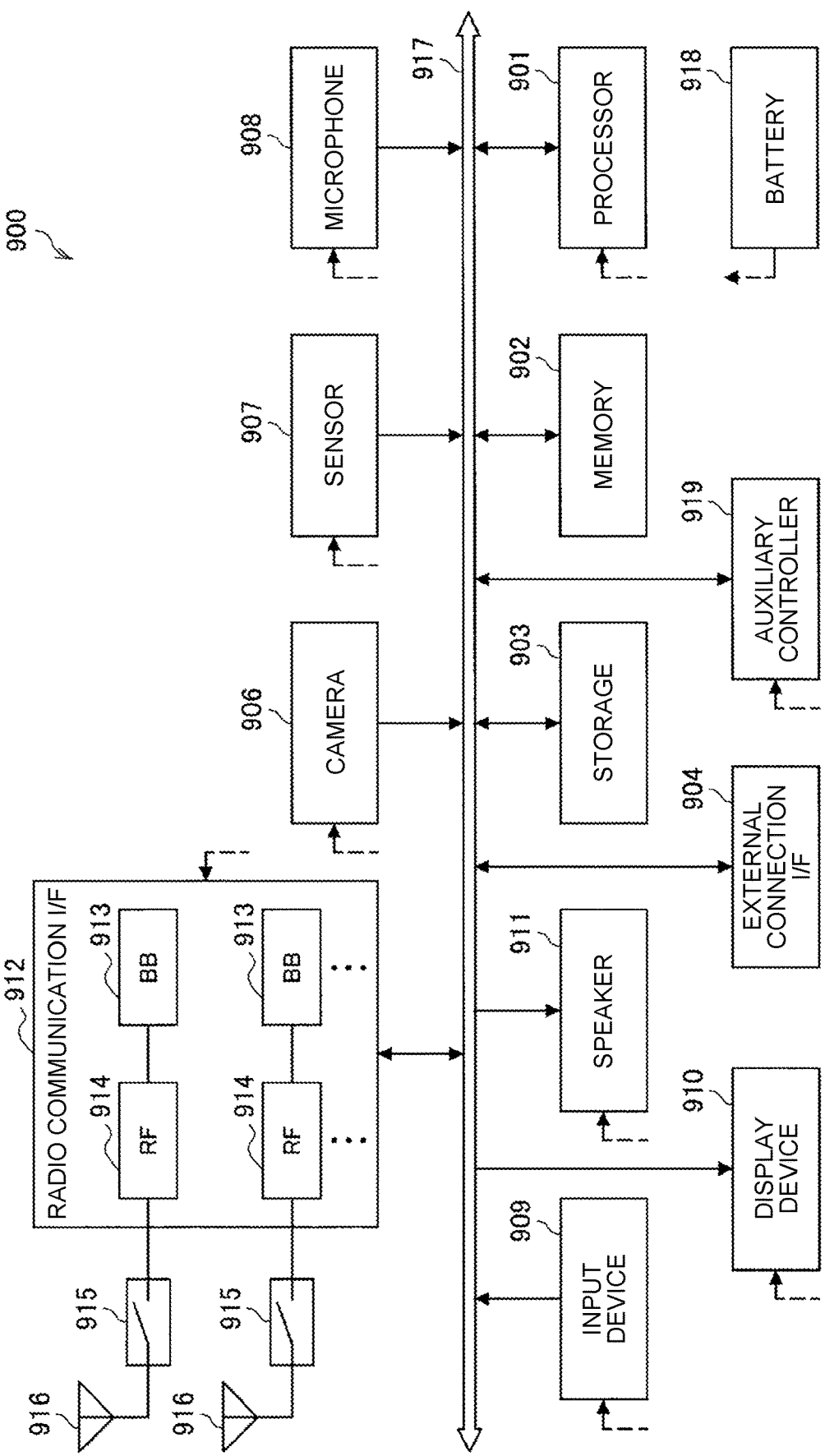
FIG. 20 is a block diagram illustrating an example of a schematic configuration of a smartphone.

5.3. Application Examples Related to Terminal Devices (First Application Example) FIG. 20 is a block diagram illustrating an example of a schematic configuration of a smartphone 900 to which the techniques according to the present disclosure are applicable. The smartphone 900 includes a processor 901, memory 902, storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be a CPU or a System on Chip (SoC), for example, and controls the functions of the application layer and other layers of the smartphone 900. The memory 902 includes RAM and ROM and stores programs to be executed by the processor 901, and data. The storage 903 can include a storage medium such as semiconductor memory or a hard disk. The external connection interface 904 is an interface for connecting an external device such as a memory card or a Universal Serial Bus (USB) device to the smartphone 900.

The camera 906 includes an image sensor such as a Charge Coupled Device (CCD) or a Complementary Metal Oxide Semiconductor (CMOS), and generates a captured image. Examples of the sensor 907 can include a group of sensors such as a positioning sensor, a gyro sensor, a geomagnetic sensor, and an acceleration sensor. The microphone 908 converts the voice input to the smartphone 900 into a voice signal. The input device 909 includes a touch sensor that detects a touch on the screen of the display device 910, a keypad, a keyboard, a button, or a switch and receives an input of operation or information from the user. The display device 910 has a screen such as a liquid crystal display (LCD) or an organic light emitting diode (OLED) display, and displays an output image of the smartphone 900. The speaker 911 converts the voice signal output from the smartphone 900 into voice.

The radio communication interface 912 supports a cellular communication scheme such as LTE or LTE-Advanced and executes radio communication. The radio communication interface 912 can typically include a BB processor 913, an RF circuit 914, or the like. The BB processor 913 may perform, for example, encoding/decoding, modulation/demodulation, and multiplexing/demultiplexing, and performs various signal processing for radio communication. The RF circuit 914 may include a mixer, a filter, an amplifier, or the like, and transmits and receives radio signals via the antenna 916. The radio communication interface 912 may be a one-chip module integrating the BB processor 913 and the RF circuit 914. The radio communication interface 912 may include a plurality of BB processors 913 and a plurality of RF circuits 914 as illustrated in FIG. 20. Although FIG. 20 illustrates an example in which the radio communication interface 912 includes a plurality of BB processors 913 and a plurality of RF circuits 914, the radio communication interface 912 may include a single BB processor 913 or a single RF circuit 914.

Furthermore, the radio communication interface 912 may support other types of radio communication scheme such as short-range radio communication scheme, near field radio communication scheme, or wireless Local Area Network (LAN) scheme in addition to the cellular communication scheme. In that case, the radio communication interface 912 may include the BB processor 913 and the RF circuit 914 for each of the radio communication schemes.

Each of the antenna switches 915 switches the connection destination of the antenna 916 between a plurality of circuits included in the radio communication interface 912 (for example, circuits for different radio communication schemes).

Each of the antennas 916 has a single or a plurality of antenna elements (for example, a plurality of antenna elements constituting a MIMO antenna) and is used for transmitting and receiving radio signals by the radio communication interface 912. The smartphone 900 may have a plurality of antennas 916 as illustrated in FIG. 20. Although FIG. 20 illustrates an example in which the smartphone 900 has the plurality of antennas 916, the smartphone 900 may have a single antenna 916.

Furthermore, the smartphone 900 may be provided with the antenna 916 for each of the radio communication schemes. In that case, the antenna switch 915 may be omitted from the configuration of the smartphone 900.

The bus 917 provides mutual connection between the processor 901, the memory 902, the storage 903, the external connection interface 904, the camera 906, the sensor 907, the microphone 908, the input device 909, the display device 910, the speaker 911, the radio communication interface 912, and the auxiliary controller 919. The battery 918 supplies power to individual blocks of the smartphone 900 illustrated in FIG. 20 via the power supply lines partially illustrated by the broken lines in the figure. The auxiliary controller 919 controls operation of minimum necessary functions of the smartphone 900 during a sleep mode, for example.

In the smartphone 900 illustrated in FIG. 20, one or more components (at least one of the communication control unit 241, the information acquisition unit 243, or the notification unit 247) included in the control unit 240 described with reference to FIG. 5 may be implemented in the radio communication interface 912. Alternatively, at least a part of these components may be implemented in the processor 901 or the auxiliary controller 919. As an example, the smartphone 900 may be equipped with a module including a part (for example, the BB processor 913) or all of the radio communication interface 912, the processor 901, and/or the auxiliary controller 919, and may be equipped with one or more of the above-described components in the module. In this case, the module may store a program for causing the processor to function as the one or more components (in other words, a program for causing the processor to perform the operation of the one or more components) and may execute the program. As another example, the program causing the processor to function as the one or more of the above components may be installed in the smartphone 900, and the radio communication interface 912 (for example, the BB processor 913), the processor 901, and/or the auxiliary controller 919 may execute the program. As described above, the smartphone 900 or the above module may be provided as a device including the one or more components, and a program for causing the processor to function as the one or more components may be provided. Furthermore, a readable recording medium on which the above program is recorded may be provided.

Furthermore, in the smartphone 900 illustrated in FIG. 20, for example, the radio communication unit 220 described with reference to FIG. 5 may be implemented in the radio communication interface 912 (for example, the RF circuit 914). Furthermore, the antenna unit 210 may be implemented in the antenna 916. Furthermore, the storage unit 230 may be implemented in the memory 902.

Second Application Example

FIG. 21 is a block diagram illustrating an example of a schematic configuration of a car navigator 920 to which the techniques according to the present disclosure are applicable. The car navigator 920 includes a processor 921, memory 922, a Global Positioning System (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be a CPU or SoC, for example, and controls the navigation function and other functions of the car navigator 920. The memory 922 includes RAM and ROM and stores programs to be executed by the processor 921, and data.

The GPS module 924 measures the position (including latitude, longitude, and altitude) of the car navigator 920 using GPS signals received from GPS satellites. The sensor 925 can include a group of sensors such as a gyro sensor, a geomagnetic sensor, and a barometric pressure sensor, for example. The data interface 926 is connected to an in-vehicle network 941 via a terminal (not illustrated), for example, and acquires data generated on the vehicle side such as vehicle speed data.

The content player 927 plays pieces of content stored on a storage medium (for example, a CD or DVD) inserted into the storage medium interface 928. The input device 929 includes a touch sensor that detects a touch on the screen of the display device 930, a button, or a switch, for example, and receives an input of operation or information from the user. The display device 930 includes a screen such as an LCD or OLED display, and displays an image of a navigation function or a content to be played. The speaker 931 outputs the sound of the navigation function or the content to be played.

The radio communication interface 933 supports a cellular communication scheme such as LTE or LTE-Advanced and executes radio communication. The radio communication interface 933 can typically include a BB processor 934, an RF circuit 935, or the like. The BB processor 934 may perform, for example, encoding/decoding, modulation/demodulation, and multiplexing/demultiplexing, and performs various signal processing for radio communication. The RF circuit 935 may include a mixer, a filter, an amplifier, or the like, and transmits and receives radio signals via the antenna 937. The radio communication interface 933 may be a one-chip module integrating the BB processor 934 and the RF circuit 935. The radio communication interface 933 may include a plurality of BB processors 934 and a plurality of RF circuits 935 as illustrated in FIG. 21. Although FIG. 21 illustrates an example in which the radio communication interface 933 includes a plurality of BB processors 934 and a plurality of RF circuits 935, the radio communication interface 933 may include a single BB processor 934 or a single RF circuit 935.

Furthermore, the radio communication interface 933 may support other types of radio communication schemes such as short-range radio communication scheme, near field radio communication scheme, or a wireless LAN scheme in addition to the cellular communication scheme. In that case, the radio communication interface 933 may include the BB processor 934 and the RF circuit 935 for each of the radio communication schemes.

Each of the antenna switches 936 switches the connection destination of the antenna 937 between a plurality of circuits included in the radio communication interface 933 (for example, circuits for different radio communication schemes).

Each of the antennas 937 has a single or a plurality of antenna elements (for example, a plurality of antenna elements constituting a MIMO antenna) and is used for transmitting and receiving radio signals by the radio communication interface 933. The car navigator 920 may have a plurality of antennas 937 as illustrated in FIG. 21. Although FIG. 21 illustrates an example in which the car navigator 920 has a plurality of antennas 937, the car navigator 920 may have a single antenna 937.

Furthermore, the car navigator 920 may include the antenna 937 for each of the radio communication schemes. In that case, the antenna switch 936 may be omitted from the configuration of the car navigator 920.

The battery 938 supplies power to individual blocks of the car navigator 920 illustrated in FIG. 21 via the power supply lines partially illustrated by the broken lines in the figure. In addition, the battery 938 stores electric power supplied from the vehicle side.

In the car navigator 920 illustrated in FIG. 21, one or more components (at least one of the communication control unit 241, the information acquisition unit 243, or the notification unit 247) included in the control unit 240 described with reference to FIG. 5 may be implemented in the radio communication interface 933. Alternatively, at least a part of these components may be implemented in the processor 921. As an example, the car navigator 920 may be equipped with a module including a part (for example, the BB processor 934) or all of the radio communication interface 933 and/or the processor 921, and the module may be equipped with one or more of the above components. In this case, the module may store a program for causing the processor to function as the one or more components (in other words, a program for causing the processor to perform the operation of the one or more components) and may execute the program. As another example, a program causing the processor to function as one or more of the above components may be installed in the car navigator 920, and the radio communication interface 933 (for example, the BB processor 934) and/or the processor 921 may execute the program. As described above, the car navigator 920 or the above module may be provided as a device including the one or more components, and a program for causing the processor to function as the one or more components may be provided. Furthermore, a readable recording medium on which the above program is recorded may be provided.

Furthermore, in the car navigator 920 illustrated in FIG. 21, the radio communication unit 220 described with reference to FIG. 5, for example, may be implemented in the radio communication interface 933 (for example, the RF circuit 935). Furthermore, the antenna unit 210 may be implemented in the antenna 937. Furthermore, the storage unit 230 may be implemented in the memory 922.

Furthermore, the technique according to the present disclosure may be actualized as an in-vehicle system (or vehicle) 940 including one or more blocks of the car navigator 920 described above, the in-vehicle network 941, and a vehicle-side module 942. That is, the in-vehicle system (or vehicle) 940 may be provided as a device equipped with at least one of the communication control unit 241, the information acquisition unit 243, a measurement unit 245, or the notification unit 247. The vehicle-side module 942 generates vehicle-side data such as vehicle speed, engine speed, or failure information, and outputs the generated data to the in-vehicle network 941.

6. Conclusion

As described above, in a system according to an embodiment of the present disclosure, the communication control device (for example, SAS) includes the acquisition unit, the specifying unit, and the control unit. The acquisition unit acquires first information regarding a channel occupied by the primary communication service among a plurality of channels allocated to the primary communication service. The specifying unit handles the channel occupied by the primary communication service only for a part of the frequency band among the frequency bands corresponding to the channel, by specifying another frequency band, that is, a frequency band other than the part of the frequency band. The control unit allocates the specified other frequency band to one or more secondary use communication devices that provide a secondary communication service different from the primary communication service described above.

With the above configuration, even with a channel recognized as only a part of the frequency band is occupied due to an occurrence of an error in the detection result of the channel occupied by the primary communication service, it is possible to allocate another frequency band to the communication device (CBSD). With this, even when an error occurs in the detection result of the channel occupied by the primary communication service, continuity of the service (in particular, the secondary communication service) can be ensured for as many communication devices as possible. That is, with the system according to an embodiment of the present disclosure, it is possible to implement spectrum sharing in a more preferable manner even in a situation where an error occurs in a detection result of frequency band used by the primary communication service.

The preferred embodiments of the present disclosure have been described in detail above with reference to the accompanying drawings. However, the technical scope of the present disclosure is not limited to such examples. It will be apparent to those skilled in the art of the present disclosure that various modifications and alterations can be conceived within the scope of the technical idea described in the claims and naturally fall within the technical scope of the present disclosure.

Furthermore, the effects described in the present specification are merely illustrative or exemplary and are not limited. That is, the techniques according to the present disclosure can exhibit other effects that are apparent to those skilled in the art from the description of the present specification in addition to or instead of the above effects.

Note that the following configurations also belong to the technical scope of the present disclosure.

(1)

A communication control device comprising:
 an acquisition unit that acquires first information regarding a channel occupied by a primary communication service among a plurality of channels allocated to the primary communication service;
 a specifying unit that handles the channel occupied by the primary communication service only in a part of a frequency band among the frequency bands corresponding to the channels by specifying another frequency band, that is, a frequency band other than the part of the frequency band; and
 a control unit that allocates the specified other frequency band to one or more secondary use communication devices that provide a secondary communication service different from the primary communication service.

(2)

The communication control device according to (1),
 wherein the first information includes second information corresponding to a detection result of the channel occupied by the primary communication service.

(3)

The communication control device according to (1) or (2),
 wherein the first information includes third information corresponding to a detection result of the channel occupied by the primary communication service, acquired by another communication control device.

(4)

The communication control device according to (3),
 wherein the acquisition unit acquires the third information from a predetermined database.

(5)

The communication control device according to any one of (1) to (4),
 wherein the acquisition unit acquires a first detection result and a second detection result detected by mutually different devices as detection results of the channel occupied by the primary communication service, and
 the control unit allocates a channel not included in either the first detection result or the second detection result among the plurality of channels, and the specified other frequency band, to one or more of the secondary use communication devices.

(6)

The communication control device according to any one of (1) to (5),
 wherein the control unit allocates the specified other frequency band to the secondary use communication device in accordance with capability related to frequency band allocation regarding the secondary use communication device.

(7)

The communication control device according to (6),
 wherein the control unit allocates at least a part of a frequency band allowed in accordance with the capability among the specified other frequency bands, to the secondary use communication device.

(8)

The communication control device according to (6) or (7), wherein the control unit determines the secondary use communication device as a target to which the specified other frequency band is to be allocated, in accordance with the capability.

(9)

The communication control device according to any one of (6) to (8), wherein the acquisition unit acquires information regarding the capability from the secondary use communication device.

(10)

The communication control device according to any one of (1) to (9), further comprising a notification unit that notifies the secondary use communication device of fourth information corresponding to an allocation result of the other frequency band to the secondary use communication device.

(11)

A communication device comprising:
a notification unit that notifies a communication control device of a request related to allocation of a part of a plurality of channels allocated to a primary communication service; and
an acquisition unit that acquires, as a response to the request, fourth information which is specified for the channel occupied by the primary communication service only for a part of a frequency band among frequency bands corresponding to the channel and which corresponds to an allocation result of another frequency band, that is, a frequency band other than the part of the frequency band.

(12)

The communication device according to (11), wherein the notification unit notifies the communication control device of information regarding capability related to frequency band allocation.

(13)

The communication device according to (12), wherein the acquisition unit acquires the fourth information corresponding to the capability.

(14)

A communication control method to be executed by a computer, the communication control method comprising:
acquiring first information regarding a channel occupied by a primary communication service among a plurality of channels allocated to the primary communication service;
handling the channel occupied by the primary communication service only in a part of a frequency band among the frequency bands corresponding to the channels by specifying another frequency band, that is, a frequency band other than the part of the frequency band; and
allocating the specified other frequency band to one or more secondary use communication devices that provide a secondary communication service different from the primary communication service.

REFERENCE SIGNS LIST

1 SYSTEM
100 COMMUNICATION DEVICE
110 ANTENNA UNIT
120 RADIO COMMUNICATION UNIT
130 NETWORK COMMUNICATION UNIT
140 STORAGE UNIT
150 CONTROL UNIT
151 COMMUNICATION CONTROL UNIT
153 INFORMATION ACQUISITION UNIT
155 NOTIFICATION UNIT
200 TERMINAL DEVICE
210 ANTENNA UNIT
220 RADIO COMMUNICATION UNIT
230 STORAGE UNIT
240 CONTROL UNIT
241 COMMUNICATION CONTROL UNIT
243 INFORMATION ACQUISITION UNIT
245 MEASUREMENT UNIT
247 NOTIFICATION UNIT
300 COMMUNICATION CONTROL DEVICE
310 COMMUNICATION UNIT
320 STORAGE UNIT
330 CONTROL UNIT
331 COMMUNICATION CONTROL UNIT
333 INFORMATION ACQUISITION UNIT
335 SPECIFYING UNIT
337 NOTIFICATION UNIT
400 NETWORK MANAGER
510 PAL DATABASE
530 MONITORING DEVICE

The invention claimed is:

1. A first communication control device, comprising:
an acquisition unit configured to acquire first information of a first channel occupied by a primary communication service among a plurality of channels allocated to the primary communication service;
a specifying unit configured to:
specify a first part of a frequency band based on the acquired first information, wherein
the frequency band corresponds to the first channel; and
handle the first channel based on the specified first part of the frequency band, wherein
the primary communication service occupies a second part of the frequency band, and
the first part is different from the second part; and
a control unit configured to allocate, based on the primary communication service occupies the second part of the frequency band, the first part of the frequency band to a secondary use communication device, wherein
the secondary use communication device provides a secondary communication service, and
the secondary communication service is different from the primary communication service.

2. The first communication control device according to claim 1, wherein the first information includes second information that corresponds to a detection result of the first channel occupied by the primary communication service.

3. The first communication control device according to claim 1, wherein
a second communication control device acquires third information, and
the first information includes the third information that corresponds to a detection result of a second channel occupied by the primary communication service.

4. The first communication control device according to claim 3, wherein
a specific database acquires the third information from the second communication control device, and
the acquisition unit is further configured to acquire the third information from the specific database.

5. The first communication control device according to claim 1, wherein a first device detects a first detection result of a second channel among the plurality of channels allocated to the primary communication service, a second device detects a second detection result of a third channel among the plurality of channels allocated to the primary communication service, the acquisition unit is further configured to acquire the first detection result and the second detection result, the control unit is further configured to allocate, based on the acquired first detection result and the second detection result, a fourth channel among the plurality of channels to the secondary use communication device, and the fourth channel is not included in either the first detection result or the second detection result.

6. The first communication control device according to claim 1, wherein the control unit is further configured to allocate the first part of the frequency band to the secondary use communication device based on a capability related to frequency band allocation of the secondary use communication device.

7. The first communication control device according to claim 6, wherein the control unit is further configured to allocate at least a part of the first part of the frequency band to the secondary use communication device based on the capability.

8. The first communication control device according to claim 6, wherein the control unit is further configured to determine, based on capability of each secondary use communication device of a plurality of secondary use communication devices, the secondary use communication device to which the first part of the frequency band is allocated, and the plurality of secondary use communication devices includes the secondary use communication device.

9. The first communication control device according to claim 6, wherein the acquisition unit is further configured to acquire information of the capability from the secondary use communication device.

10. The first communication control device according to claim 1, further comprising a notification unit configured to notify the secondary use communication device of fourth information that corresponds to an allocation result of the first part of the frequency band.

11. A communication device, comprising:

a notification unit configured to notify a communication control device of a request related to allocation of a first part of a frequency band to the communication device, wherein the frequency band corresponds to a channel, occupied by a primary communication service, among a plurality of channels allocated to the primary communication service, the primary communication service occupies a second part of the frequency band, and the first part is different from the second part; and an acquisition unit configured to acquire, based on the primary communication service occupies the second part of the frequency band, information that corresponds to the allocation of the first part of the frequency band to the communication device.

12. The communication device according to claim 11, wherein the notification unit is further configured to notify the communication control device of information of capability related to frequency band allocation of the communication device.

13. The communication device according to claim 12, wherein the acquisition unit is further configured to acquire the information that corresponds to the capability.

14. A communication control method comprising:

acquiring first information of a first channel occupied by a primary communication service among a plurality of channels allocated to the primary communication service;

specifying a first part of a frequency band based on the acquired first information, wherein the frequency band corresponds to the first channel; and handling the first channel based on the specified first part of the frequency band, wherein the primary communication service occupies a second part of the frequency band, and the first part is different from the second part; and allocating, based on the primary communication service occupies the second part of the frequency band, the first part of the frequency band to a secondary use communication device, wherein the secondary use communication device provides a secondary communication service, and the secondary communication service is different from the primary communication service.

\* \* \* \* \*